(12) United States Patent
Segal et al.

(10) Patent No.: US 8,376,754 B2
(45) Date of Patent: Feb. 19, 2013

(54) TRAINING AID FOR A DENTAL INJECTION

(76) Inventors: Brigitte Segal, New York, NY (US);
Ana-Claudia Everton, Hempstead, NY (US)

( * ) Notice: Subject to any disclaimer, the term of this patent is extended or adjusted under 35 U.S.C. 154(b) by 0 days.

(21) Appl. No.: 13/134,658

(22) Filed: Jun. 14, 2011

(65) Prior Publication Data
US 2011/0294103 A1 Dec. 1, 2011

Related U.S. Application Data

(63) Continuation-in-part of application No. 11/890,895, filed on Aug. 8, 2007, now abandoned.

(60) Provisional application No. 60/837,492, filed on Aug. 14, 2006.

(51) Int. Cl.
*G09B 23/28* (2006.01)
(52) U.S. Cl. ........................................ 434/263
(58) Field of Classification Search .................. 434/263, 434/264
See application file for complete search history.

(56) References Cited

U.S. PATENT DOCUMENTS 3,789,518 A * 2/1974 Chase ........................... 434/272
7,537,455 B2 * 5/2009 Cope ............................. 434/263

* cited by examiner

*Primary Examiner* — Xuan Thai
*Assistant Examiner* — Evan Page
(74) *Attorney, Agent, or Firm* — Charles E. Baxley

(57) ABSTRACT

A training aid for a dental injection, including a human-like head model, a first apparatus for alerting when the dental injection is properly positioned in the human-like head model, and a second apparatus for alerting when the dental injection is not properly positioned in the human-like head model. The interior structure of the human-like head includes for targeting purposes the maxilla with appropriate arteries and nerves being clearly visible, the mandible with appropriate arteries and nerves being clearly visible, and the buccal gingiva over the mandibular canal being clearly visible. The first apparatus and the second apparatus are so positioned within the human-like head model to allow for training for the dental injection including a V2 block including infiltration, posterior superior alveolar, middle superior alveolar anterior superior, infraorbital, greater palatine, and nasopalatine, and V3 blocks including inferior alveolar, buccal nerve, and mental block.

15 Claims, 14 Drawing Sheets

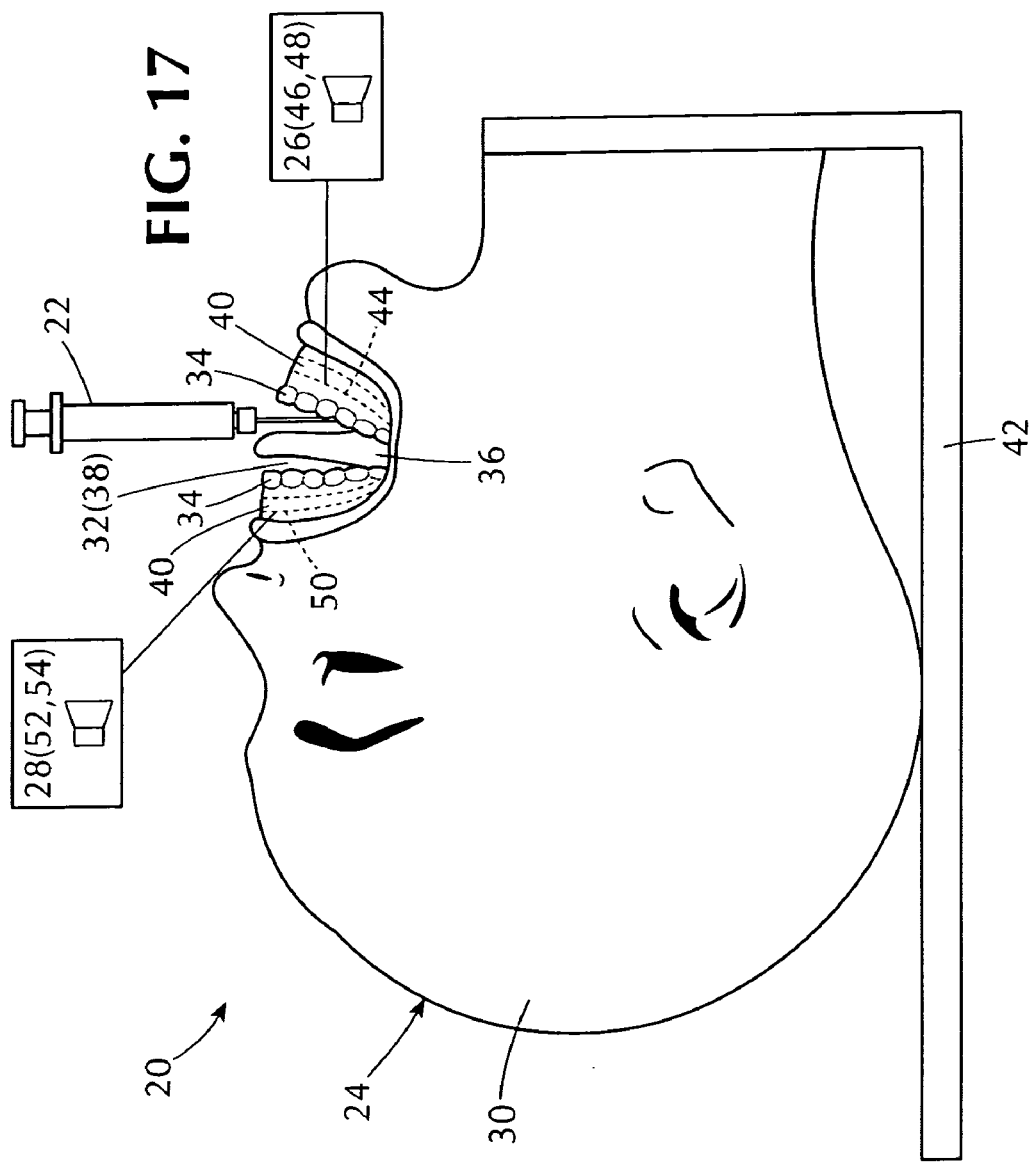

US 8,376,754 B2

TRAINING AID FOR A DENTAL INJECTION

1. CROSS REFERENCE TO RELATED APPLICATIONS

The instant non-provisional patent application is a non-provisional Continuation-In-Part patent application of parent non-provisional patent application Ser. No. 11/890,895, filed on Aug. 8, 2007, now abandoned and entitled TRAINING AID FOR A DENTAL INJECTION that claims priority from provisional patent application No. 60/837,492, filed on Aug. 14, 2006, entitled TRAINING APPARATUS FOR DENTAL INJECTIONS, and incorporated herein by reference thereto.

2. BACKGROUND OF THE INVENTION

A. Field of the Invention

The embodiments of the present invention relate to a dental training aid, and more particularly, the embodiments of the present invention relate to a training aid for a dental injection.

B. Description of the Prior Art

The maxillæ[1] are the largest bones of the face, excepting the mandible, and form by their union the whole of the upper jaw. Each assists in forming the boundaries of three cavities, viz., the roof of the mouth, the floor and lateral wall of the nose, and the floor of the orbit. It also enters into the formation of two fossæ, the infratemporal and pterygopalatine, and two fissures, the inferior orbital and pterygomaxillary.

[1] www.bartleby.com/107/38.html.

Each bone consists of a body and four processes—zygomatic, frontal, alveolar, and palatine.

The body (corpus maxilla) is somewhat pyramidal in shape, and contains a large cavity, the maxillary sinus (antrum of Highmore). It has four surfaces: anterior, a posterior or infratemporal, a superior or orbital, and a medial or nasal.

The anterior surface, as shown in FIG. 1, which is diagrammatic side elevational view of the outer surface of the left maxilla, is directed forward and lateralward. It presents at its lower part a series of eminences corresponding to the positions of the roots of the teeth. Just above those of the incisor teeth is a depression, the incisive fossa, which gives origin to the Depressor alænasi; to the alveolar border below the fossa is attached a slip of the Orbicularis oris; above and a little lateral to it, the Nasalis arises. Lateral to the incisive fossa is another depression, the canine fossa. The canine fossa is larger and deeper than the incisive fossa, and is separated from it by a vertical ridge, the canine eminence, corresponding to the socket of the canine tooth. The canine fossa gives origin to the Caninus. Above the fossa is the infraorbital foramen, the end of the infraorbital canal; it transmits the infraorbital vessels and nerve. Above the foramen is the margin of the orbit, which affords attachment to part of the Quadratus labii superioris. Medially, the anterior surface is limited by a deep concavity, the nasal notch, the margin of which gives attachment to the Dilatator naris posterior and ends below in a pointed process, which with its fellow of the opposite side forms the anterior nasal spine.

The infratemporal surface, as shown in FIG. 1, is convex, directed backward and lateralward, and forms part of the infratemporal fossa. It is separated from the anterior surface by the zygomatic process and by a strong ridge, extending upward from the socket of the first molar tooth. It is pierced about its center by the apertures of the alveolar canals, which transmit the posterior superior alveolar vessels and nerves. At the lower part of this surface is a rounded eminence, the maxillary tuberosity, especially prominent after the growth of the wisdom tooth. The maxillary tuberosity is rough on its lateral side for articulation with the pyramidal process of the palatine bone and in some cases articulates with the lateral pterygoid plate of the sphenoid. It gives origin to a few fibers of the Pterygoideus internus. Immediately above this is a smooth surface, which forms the anterior boundary of the pterygopalatine fossa, and presents a groove, for the maxillary nerve; this groove is directed lateralward and slightly upward, and is continuous with the infraorbital groove on the orbital surface.

The orbital surface, as shown in FIG. 1, is smooth and triangular, and forms the greater part of the floor of the orbit. It is bounded medially by an irregular margin which in front presents a notch, the lacrimal notch. Behind this notch the margin articulates with the lacrimal, the lamina papyracea of the ethmoid, and the orbital process of the palatine. It is bounded behind by a smooth rounded edge which forms the anterior margin of the inferior orbital fissure, and sometimes articulates at its lateral extremity with the orbital surface of the great wing of the sphenoid.

It is limited in front by part of the circumference of the orbit, which is continuous medially with the frontal process, and laterally with the zyogmatic process. Near the middle of the posterior part of the orbital surface is the infraorbital groove, for the passage of the infraorbital vessels and nerve. The groove begins at the middle of the posterior border, where it is continuous with that near the upper edge of the infratemporal surface, and, passing forward, ends in a canal, which subdivides into two branches. One of the canals, the infraorbital canal, opens just below the margin of the orbit; the other, which is smaller, runs downward in the substance of the anterior wall of the maxillary sinus, and transmits the anterior superior alveolar vessels and nerve to the front teeth of the maxilla. From the back part of the infraorbital canal, a second small canal is sometimes given off; it runs downward in the lateral wall of the sinus, and conveys the to the premolar teeth. At the medial and forepart of the orbital surface just lateral to the lacrimal groove, is a depression, which gives origin to the Obliquus oculi inferior.

The nasal surface, as shown in FIG. 2, which is a diagrammatic side elevational view of the nasal surface of the left maxilla, presents a large, irregular opening leading into the maxillary sinus. At the upper border of this aperture are some broken air cells, which, in the articulated skull, are closed in by the ethmoid and lacrimal bones. Below the aperture is a smooth concavity which forms part of the inferior meatus of the nasal cavity, and behind it is a rough surface for articulation with the perpendicular part of the palatine bone; this surface is traversed by a groove, commencing near the middle of the posterior border and running obliquely downward and forward; the groove is converted into a canal, the pterygopalatine canal, by the palatine bone. In front of the opening of the sinus is a deep groove, the lacrimal groove, which is converted into the nasolacrimal canal, by the lacrimal bone and inferior nasal concha; this canal opens into the inferior meatus of the nose and transmits the nasolacrimal duct. More anteriorly is an oblique ridge, the conchal crest, for articulation with the inferior nasal concha. The shallow concavity above this ridge forms part of the atrium of the middle meatus of the nose, and that below it, part of the inferior meatus.

The Maxillary Sinus or Antrum of Highmore (sinus maxillaris) is a large pyramidal cavity, within the body of the maxilla: its apex, directed lateralward, is formed by the zygomatic process; its base, directed medialward, by the lateral wall of the nose. Its walls are everywhere exceedingly thin, and correspond to the nasal orbital, anterior, and infratemporal surfaces of the body of the bone. Its nasal wall, or base, presents, in the disarticulated bone, a large, irregular aperture, communicating with the nasal cavity. In the articulated skull this aperture is much reduced in size by the following bones: the uncinate process of the ethmoid above, the ethmoidal process of the inferior nasal concha below, the vertical part of the palatine behind, and a small part of the lacrimal above and in front, as shown in FIGS. 2 and 3, which are, respectively, again, a diagrammatic side elevational view of the nasal surface of the left maxilla, and a diagrammatic side elevational view of the left maxillary sinus opened from the exterior. The sinus communicates with the middle meatus of the nose, generally by two small apertures left between the above-mentioned bones. In the fresh state, usually only one small opening exists, near the upper part of the cavity; the other is closed by mucous membrane. On the posterior wall are the alveolar canals, transmitting the posterior superior alveolar vessels and nerves to the molar teeth. The floor is formed by the alveolar process of the maxilla, and, if the sinus be of an average size, is on a level with the floor of the nose; if the sinus be large it reaches below this level.

Projecting into the floor of the antrum are several conical processes, corresponding to the roots of the first and second molar teeth;[2] in some cases the floor is perforated by the fangs of the teeth. The infraorbital canal usually projects into the cavity as a well-marked ridge extending from the roof to the anterior wall; additional ridges are sometimes seen in the posterior wall of the cavity, and are caused by the alveolar canals. The size of the cavity varies in different skulls, and even on the two sides of the same skull.[3]

[2] The number of teeth whose roots are in relation with the floor of the antrum is variable. The sinus "may extend so as to be in relation to all the teeth of the true maxilla, from the canine to the dens sapientiæ." (Salter.)

[3] Aldren Turner (op. cit.) gives the following measurements as those of an average sized sinus: vertical height opposite first molar tooth, 1½ inch; transverse breadth, 1 inch; and antero-posterior depth, 1¼ inch.

The Zygomatic Process (processus zygomaticus; malar process) is a rough triangular eminence, situated at the angle of separation of the anterior, zygomatic, and orbital surfaces. In front it forms part of the anterior surface; behind, it is concave, and forms part of the infratemporal fossa; above, it is rough and serrated for articulation with the zygomatic bone; while below, it presents the prominent arched border which marks the division between the anterior and infratemporal surfaces.

The Frontal Process (processus frontalis; nasal process) is a strong plate, which projects upward, medialward, and backward, by the side of the nose, forming part of its lateral boundary. Its lateral surface is smooth, continuous with the anterior surface of the body, and gives attachment to the Quadratus labii superioris, the Orbicularis oculi, and the medial palpebral ligament. Its medial surface forms part of the lateral wall of the nasal cavity; at its upper part is a rough, uneven area, which articulates with the ethmoid, closing in the anterior ethmoidal cells; below this is an oblique ridge, the ethmoidal crest, the posterior end of which articulates with the middle nasal concha, while the anterior part is termed the agger nasi; the crest forms the upper limit of the atrium of the middle meatus. The upper border articulates with the frontal bone and the anterior with the nasal; the posterior border is thick, and hollowed into a groove, which is continuous below with the lacrimal groove on the nasal surface of the body: by the articulation of the medial margin of the groove with the anterior border of the lacrimal a corresponding groove on the lacrimal is brought into continuity, and together they form the lacrimal fossa for the lodgement of the lacrimal sac. The lateral margin of the groove is named the anterior lacrimal crest, and is continuous below with the orbital margin; at its junction with the orbital surface is a small tubercle, the lacrimal tubercle, which serves as a guide to the position of the lacrimal sac.

The Alveolar Process (rocessus alveolaris) is the thickest and most spongy part of the bone. It is broader behind than in front, and excavated into deep cavities for the reception of the teeth. These cavities are eight in number, and vary in size and depth according to the teeth they contain. That for the canine tooth is the deepest; those for the molars are the widest, and are subdivided into minor cavities by septa; those for the incisors are single, but deep and narrow. The Buccinator arises from the outer surface of this process, as far forward as the first molar tooth. When the maxilla are articulated with each other, their alveolar processes together form the alveolar arch; the center of the anterior margin of this arch is named the alveolar point.

The Palatine Process (processus palatinus; palatal process) is thick and strong, and is horizontal and projects medialward from the nasal surface of the bone. It forms a considerable part of the floor of the nose and the roof of the mouth and is much thicker in front than behind. Its inferior surface, as shown in FIG. 4, which is a diagrammatic plan view of the bony palate and alveolar, is concave, rough and uneven, and forms, with the palatine process of the opposite bone, the anterior three-fourths of the hard plate. It is perforated by numerous foramina for the passage of the nutrient vessels; is channelled at the back part of its lateral border by a groove, sometimes a canal, for the transmission of the descending palatine vessels and the anterior palatine nerve from the spheno-palatine ganglion; and presents little depressions for the lodgement of the palatine glands. When the two maxilla are articulated, a funnel-shaped opening, the incisive foramen, is seen in the middle line, immediately behind the incisor teeth. In this opening the orifices of two lateral canals are visible; they are named the incisive canals or foramina of Stenson; through each of them passes the terminal branch of the descending palatine artery and the nasopalatine nerve. Occasionally two additional canals are present in the middle line; they are termed the foramina of Scarpa, and when present transmit the nasopalatine nerves, the left passing through the anterior, and the right through the posterior canal. On the under surface of the palatine process, a delicate linear suture, well seen in young skulls, may sometimes be noticed extending lateralward and forward on either side from the incisive foramen to the interval between the lateral incisor and the canine tooth. The small part in front of this suture constitutes the premaxilla (os incisivum), which in most vertebrates forms an independent bone; it includes the whole thickness of the alveolus, the corresponding part of the floor of the nose and the anterior nasal spine, and contains the sockets of the incisor teeth. The upper surface of the palatine process is concave from side to side, smooth, and forms the greater part of the floor of the nasal cavity. It presents, close to its medial margin, the upper orifice of the incisive canal. The lateral border of the process is incorporated with the rest of the bone. The medial border is thicker in front than behind, and is raised above into a ridge, the nasal crest, which, with the corresponding ridge of the opposite bone, forms a groove for the reception of the vomer. The front part of this ridge rises to a considerable height, and is named the incisor crest; it is prolonged forward into a sharp process, which forms, together with a similar process of the opposite bone, the anterior nasal spine. The posterior border is serrated for articulation with the horizontal part of the palatine bone.

The maxilla is ossified in membrane. Mall[4] and Fawcett[5] maintain that it is ossified from two centers only, one for the maxilla proper and one for the premaxilla. These centers appear during the sixth week of fetal life and unite in the beginning of the third month, but the suture between the two portions persists on the palate until nearly middle life. Mall states that the frontal process is developed from both centers. The maxillary sinus appears as a shallow groove on the nasal surface of the bone about the fourth month of fetal life, but does not reach its full size until after the second dentition. The maxilla was formerly described as ossifying from six centers, viz., one, the orbitonasal, forms that portion of the body of the bone which lies medial to the infraorbital canal, including the medial part of the floor of the orbit and the lateral wall of the nasal cavity; a second, the zygomatic, gives origin to the portion which lies lateral to the infraorbital canal, including the zygomatic process; from a third, the palatine, is developed the palatine process posterior to the incisive canal together with the adjoining part of the nasal wall; a fourth, the premaxillary, forms the incisive bone which carries the incisor teeth and corresponds to the premaxilla of the lower vertebrates;[6] a fifth, the nasal, gives rise to the frontal process and the portion above the canine tooth; and a sixth, the infravomerine, lies between the palatine and premaxillary centers and beneath the vomer; this center, together with the corresponding center of the opposite bone, separates the incisive canals from each other.

[4] American Journal of Anatomy, 1906, vol. v.
[5] Journal of Anatomy and Physiology, 1911, vol. xlv.
[6] Some anatomists believe that the premaxillary bone is ossified by two centers (see page 299).

The maxilla articulates with nine bones: two of the cranium, the frontal and ethmoid, and seven of the face, viz., the nasal, zygomatic, lacrimal, inferior nasal concha, palatine, vomer, and its fellow of the opposite side. Sometimes it articulates with the orbital surface, and sometimes with the lateral pterygoid plate of the sphenoid.

At birth the transverse and antero-posterior diameters of the bone are each greater than the vertical. The frontal process is well-marked and the body of the bone consists of little more than the alveolar process, the teeth sockets reaching almost to the floor of the orbit. The maxillary sinus presents the appearance of a furrow on the lateral wall of the nose. In the adult the vertical diameter is the greatest, owing to the development of the alveolar process and the increase in size of the sinus. In old age the bone reverts in some measure to the infantile condition; its height is diminished, and after the loss of the teeth the alveolar process is absorbed, and the lower part of the bone contracted and reduced in thickness.

The mandible,[7] the largest and strongest bone of the face, serves for the reception of the lower teeth. It consists of a curved, horizontal portion, the body, and two perpendicular portions, the rami, which unite with the ends of the body nearly at right angles.

[7] www.bartleby.com/107/44.html.

The Body (corpus mandibulce) is curved somewhat like a horseshoe and has two surfaces and two borders.

The external surface, as shown in FIG. 5, which is a diagrammatic side elevational view of the outer surface of the mandible, is marked in the median line by a faint ridge, indicating the symphysis or line of junction of the two pieces of which the bone is composed at an early period of life. This ridge divides below and encloses a triangular eminence, the mental protuberance, the base of which is depressed in the center but raised on either side to form the mental tubercle. On either side of the symphysis, just below the incisor teeth, is a depression, the incisive fossa, which gives origin to the Mentalis and a small portion of the Orbicularis oris.

Below the second premolar tooth, on either side, midway between the upper and lower borders of the body, is the mental foramen, for the passage of the mental vessels and nerve. Running backward and upward from each mental tubercle is a faint ridge, the oblique line, which is continuous with the anterior border of the ramus; it affords attachment to the Quadratus labii inferioris and Triangularis; the Platysma is attached below it.

The internal surface, as shown in FIG. 6, which is a diagrammatic side elevational view of the inner surface of the mandible, is concave from side to side. Near the lower part of the symphysis is a pair of laterally placed spines, termed the mental spines, which give origin to the Genioglossi. Immediately below these is a second pair of spines, or more frequently a median ridge or impression, for the origin of the Geniohyoidei. In some cases the mental spines are fused to form a single eminence, in others they are absent and their position is indicated merely by an irregularity of the surface. Above the mental spines a median foramen and furrow are sometimes seen; they mark the line of union of the halves of the bone. Below the mental spines, on either side of the middle line, is an oval depression for the attachment of the anterior belly of the Digastricus. Extending upward and backward on either side from the lower part of the symphysis is the mylohyoid line, which gives origin to the Mylohyoideus; the posterior part of this line, near the alveolar margin, gives attachment to a small part of the Constrictor pharyngis superior, and to the pterygomandibular raphe. Above the anterior part of this line is a smooth triangular area against which the sublingual gland rests, and below the hinder part, an oval fossa for the submaxillary gland.

The superior or alveolar border, wider behind than in front, is hollowed into cavities, for the reception of the teeth; these cavities are sixteen in number, and vary in depth and size according to the teeth which they contain. To the outer lip of the superior border, on either side, the Buccinator is attached as far forward as the first molar tooth. The inferior border is rounded, longer than the superior, and thicker in front than behind; at the point where it joins the lower border of the ramus a shallow groove; for the external maxillary artery, may be present.

The Ramus (ramus mandibulæ; perpendicular portion) is quadrilateral in shape, and has two surfaces, four borders, and two processes.

The lateral surface, as shown in FIG. 5, is flat and marked by oblique ridges at its lower part; it gives attachment throughout nearly the whole of its extent to the Masseter. The medial surface, as shown in FIG. 6, presents about its center the oblique mandibular foramen, for the entrance of the inferior alveolar vessels and nerve. The margin of this opening is irregular; it presents in front a prominent ridge, surmounted by a sharp spine, the lingula mandibulæ, which gives attachment to the sphenomandibular ligament; at its lower and back part is a notch from which the mylohyoid groove runs obliquely downward and forward, and lodges the mylohyoid vessels and nerve. Behind this groove is a rough surface, for the insertion of the Pterygoideus internus. The mandibular canal runs obliquely downward and forward in the ramus, and then horizontally forward in the body, where it is placed under the alveoli and communicates with them by small openings. On arriving at the incisor teeth, it turns back to communicate with the mental foramen, giving off two small canals which run to the cavities containing the incisor teeth. In the posterior two-thirds of the bone the canal is situated nearer the internal surface of the mandible; and in the anterior third, nearer its external surface. It contains the inferior alveolar vessels and nerve, from which branches are distributed to the teeth. The lower border of the ramus is thick, straight, and continuous with the inferior border of the body of the bone. At its junction with the posterior border is the angle of the mandible, which may be either inverted or everted and is marked by rough, oblique ridges on each side, for the attachment of the Masseter laterally, and the Pterygoideus internus medially; the stylomandibular ligament is attached to the angle between these muscles. The anterior border is thin above, thicker below, and continuous with the oblique line. The posterior border is thick, smooth, rounded, and covered by the parotid gland. The upper border is thin, and is surmounted by two processes, the coronoid in front and the condyloid behind, separated by a deep concavity, the mandibular notch.

The Coronoid Process (processus coronoideus) is a thin, triangular eminence, which is flattened from side to side and varies in shape and size. Its anterior border is convex and is continuous below with the anterior border of the ramus; its posterior border is concave and forms the anterior boundary of the mandibular notch. Its lateral surface is smooth, and affords insertion to the Temporalis and Masseter. Its medial surface gives insertion to the Temporalis, and presents a ridge which begins near the apex of the process and runs downward and forward to the inner side of the last molar tooth. Between this ridge and the anterior border is a grooved triangular area, the upper part of which gives attachment to the Temporalis, the lower part to some fibers of the Buccinator.

The Condyloid Process (processus condyloideus) is thicker than the coronoid, and consists of two portions: the condyle, and the constricted portion which supports it, the neck. The condyle presents an articular surface for articulation with the articular disk of the temporomandibular joint; it is convex from before backward and from side to side, and extends farther on the posterior than on the anterior surface. Its long axis is directed medialward and slightly backward, and if prolonged to the middle line will meet that of the opposite condyle near the anterior margin of the foramen magnum. At the lateral extremity of the condyle is a small tubercle for the attachment of the temporomandibular ligament. The neck is flattened from before backward, and strengthened by ridges which descend from the forepart and sides of the condyle. Its posterior surface is convex; its anterior presents a depression for the attachment of the Pterygoideus externus.

The mandibular notch, separating the two processes, is a deep semilunar depression, and is crossed by the masseteric vessels and nerve.

The mandible is ossified in the fibrous membrane covering the outer surfaces of Meckel's cartilages. These cartilages form the cartilaginous bar of the mandibular arch and are two in number, a right and a left. Their proximal or cranial ends are connected with the ear capsules, and their distal extremities are joined to one another at the symphysis by mesodermal tissue. They run forward immediately below the condyles and then, bending downward, lie in a groove near the lower border of the bone; in front of the canine tooth they incline upward to the symphysis. From the proximal end of each cartilage the malleus and incus, two of the bones of the middle ear, are developed; the next succeeding portion, as far as the lingula, is replaced by fibrous tissue, which persists to form the sphenomandibular ligament. Between the lingula and the canine tooth the cartilage disappears, while the portion of it below and behind the incisor teeth becomes ossified and incorporated with this part of the mandible.

Ossification takes place in the membrane covering the outer surface of the ventral end of Meckel's cartilage, as shown in FIGS. 7-10, which are, respectively, a diagrammatic side elevational view of the outer aspect of the mandible of a human embryo 24 mm. long, a diagrammatic side elevational view of the inner aspect of the mandible of a human embryo 24 mm. long, a disgrammatic side elevational view of the outer aspect of the mandible of a human embryo 95 mm. long, and a diagrammatic side elevational view of the inner aspect of the mandible of a human embryo 95 mm. long, and each half of the bone is formed from a single center which appears, near the mental foramen, about the sixth week of fetal life. By the tenth week the portion of Meckel's cartilage which lies below and behind the incisor teeth is surrounded and invaded by the membrane bone. Somewhat later, accessory nuclei of cartilage make their appearance, viz., a wedge-shaped nucleus in the condyloid process and extending downward through the ramus; a small strip along the anterior border of the coronoid process; and smaller nuclei in the front part of both alveolar walls and along the front of the lower border of the bone. These accessory nuclei possess no separate ossific centers, but are invaded by the surrounding membrane bone and undergo absorption. The inner alveolar border, usually described as arising from a separate ossific center (splenial center), is formed in the human mandible by an ingrowth from the main mass of the bone. At birth the bone consists of two parts, united by a fibrous symphysis, in which ossification takes place during the first year.

The foregoing description of the ossification of the mandible is based on the researches of Low and Fawcett, and differs somewhat from that usually given.

The trigeminal nerve[8] is the largest cranial nerve and is the great sensory nerve of the head and face, and the motor nerve of the muscles of mastication.

[8] www.bartleby.com/107/200.html.

It emerges from the side of the pons, near its upper border, by a small motor and a large sensory root—the former being situated in front of and medial to the latter.

The fibers of the motor root arise from two nuclei, a superior and an inferior. The superior nucleus consists of a strand of cells occupying the whole length of the lateral portion of the gray substance of the cerebral aqueduct. The inferior or chief nucleus is situated in the upper part of the pons, close to its dorsal surface, and along the line of the lateral margin of the rhomboid fossa. The fibers from the superior nucleus constitute the mesencephalic root: they descend through the mid-brain, and, entering the pons, join with the fibers from the lower nucleus, and the motor root, thus formed, passes forward through the pons to its point of emergence. It is uncertain whether the mesencephalic root is motor or sensory.

The fibers of the sensory root arise from the cells of the semilunar ganglion which lies in a cavity of the dura mater near the apex of the petrous part of the temporal bone. They pass backward below the superior petrosal sinus and tentorium cerebelli, and, entering the pons, divide into upper and lower roots. The upper root ends partly in a nucleus which is situated in the pons lateral to the lower motor nucleus, and partly in the locus cæruleus; the lower root descends through the pons and medulla oblongata, and ends in the upper part of the substantia gelatinosa of Rolando. This lower root is sometimes named the spinal root of the nerve. Medullation of the fibers of the sensory root begins about the fifth month of fetal life, but the whole of its fibers are not medullated until the third month after birth.

The Semilunar Ganglion (ganglion semilunare [Gasser]; Gasserian ganglion) occupies a cavity (cavum Meckelii) in the dura mater covering the trigeminal impression near the apex of the petrous part of the temporal bone. It is somewhat crescentic in shape, with its convexity directed forward: medially, it is in relation with the internal carotid artery and the posterior part of the cavernous sinus. The motor root runs in front of and medial to the sensory root, and passes beneath the ganglion; it leaves the skull through the foramen ovale, and, immediately below this foramen, joins the mandibular nerve. The greater superficial petrosal nerve lies also underneath the ganglion.

The ganglion receives, on its medial side, filaments from the carotid plexus of the sympathetic. It give off minute branches to the tentorium cerebelli, and to the dura mater in the middle fossa of the cranium. From its convex border, which is directed forward and lateralward, three large nerves proceed, viz., the ophthalmic, maxillary, and mandibular. The ophthalmic and maxillary consist exclusively of sensory fibers; the mandibular is joined outside the cranium by the motor root.

Associated with the three divisions of the trigeminal nerve are four small ganglia. The ciliary ganglion is connected with the ophthalmic nerve; the sphenopalatine ganglion with the maxillary nerve; and the otic and submaxillary ganglia with the mandibular nerve. All four receive sensory filaments from the trigeminal, and motor and sympathetic filaments from various sources; these filaments are called the roots of the ganglia.

The Ophthalmic Nerve (n. ophthalmicus), as shown in FIG. 11, which is a diagrammatic side elevational view of the side view of the the nerves of the orbit and the ciliary ganglion, or first division of the trigeminal, is a sensory nerve. It supplies branches to the cornea, ciliary body, and iris; to the lacrimal gland and conjunctiva; to the part of the mucous membrane of the nasal cavity; and to the skin of the eyelids, eyebrow, forehead, and nose. It is the smallest of the three divisions of the trigeminal, and arises from the upper part of the semilunar ganglion as a short, flattened band, about 2.5 cm. long, which passes forward along the lateral wall of the cavernous sinus, below the oculomotor and trochlear nerves; just before entering the orbit, through the superior orbital fissure, it divides into three branches, lacrimal, frontal, and nasociliary.

The ophthalmic nerve is joined by filaments from the cavernous plexus of the sympathetic, and communicates with the oculomotor, trochlear, and abducent nerves; it gives off a recurrent filament which passes between the layers of the tentorium.

The Lacrimal Nerve (n. lacrimalis) is the smallest of the three branches of the ophthalmic.

It sometimes receives a filament from the trochlear nerve, but this is possibly derived from the branch which goes from the ophthalmic to the trochlear nerve. It passes forward in a separate tube of dura mater, and enters the orbit through the narrowest part of the superior orbital fissure. In the orbit it runs along the upper border of the Rectus lateralis, with the lacrimal artery, and communicates with the zygomatic branch of the maxillary nerve. It enters the lacrimal gland and gives off several filaments, which supply the gland and the conjunctiva. Finally it pierces the orbital septum, and ends in the skin of the upper eyelid, joining with filaments of the facial nerve. The lacrimal nerve is occasionally absent, and its place is then taken by the zygomaticotemporal branch of the maxillary. Sometimes the latter branch is absent, and a continuation of the lacrimal is substituted for it.

The Frontal Nerve (n. frontalis) is the largest branch of the ophthalmic, and may be regarded, both from its size and direction, as the continuation of the nerve. It enters the orbit through the superior orbital fissure, and runs forward between the Levator palpebræ superioris and the periosteum. Midway between the apex and base of the orbit it divides into two branches, supratrochlear and supraorbital.

The supratrochlear nerve (n. supratrochlearis), the smaller of the two, passes above the pulley of the Obliquus superior, and gives off a descending filament, to join the infratrochlear branch of the nasociliary nerve. It then escapes from the orbit between the pulley of the Obliquus superior and the supraorbital foramen, curves up on to the forehead close to the bone, ascends beneath the Corrugator and Frontalis, and dividing into branches which pierce these muscles, it supplies the skin of the lower part of the forehead close to the middle line and sends filaments to the conjunctiva and skin of the upper eyelid.

The supraorbital nerve (n. supraorbitalis) passes through the supraorbital foramen, and gives off, in this situation, palpebral filaments to the upper eyelid. It then ascends upon the forehead, and ends in two branches, a medial and a lateral, which supply the integument of the scalp, reaching nearly as far back as the lambdoidal suture; they are at first situated beneath the Frontalis, the medial branch perforating the muscle, the lateral branch the galea aponeurotica. Both branches supply small twigs to the pericranium.

The Nasociliary Nerve (n. nasociliaris; nasal nerve) is intermediate in size between the frontal and lacrimal, and is more deeply placed. It enters the orbit between the two heads of the Rectus lateralis, and between the superior and inferior rami of the oculomotor nerve. It passes across the optic nerve and runs obliquely beneath the Rectus superior and Obliquus superior, to the medial wall of the orbital cavity. Here it passes through the anterior ethmoidal foramen, and, entering the cavity of the cranium, traverses a shallow groove on the lateral margin of the front part of the cribriform plate of the ethmoid bone, and runs down, through a slit at the side of the crista galli, into the nasal cavity. It supplies internal nasal branches to the mucous membrane of the front part of the septum and lateral wall of the nasal cavity. Finally, it emerges, as the external nasal branch, between the lower border of the nasal bone and the lateral nasal cartilage, and, passing down beneath the Nasalis muscle, supplies the skin of the ala and apex of the nose.

The nasociliary nerve gives off the following branches, viz.: the long root of the ciliary ganglion, the long ciliary, and the ethmoidal nerves.

The long root of the ciliary ganglion (radix longa ganglii ciliaris) usually arises from the nasociliary between the two heads of the Rectus lateralis. It passes forward on the lateral side of the optic nerve, and enters the postero-superior angle of the ciliary ganglion; it is sometimes joined by a filament from the cavernous plexus of the sympathetic, or from the superior ramus of the trochlear nerve.

The long ciliary nerves (nn. ciliares longi), two or three in number, are given off from the nasociliary, as it crosses the optic nerve. They accompany the short ciliary nerves from the ciliary ganglion, pierce the posterior part of the sclera, and running forward between it and the choroid, are distributed to the iris and cornea. The long ciliary nerves are supposed to contain sympathetic fibers from the superior cervical ganglion to the Dilator pupillæ muscle.

The infratrochlear nerve (n. infratrochlearis) is given off from the nasociliary just before it enters the anterior ethmoidal foramen. It runs forward along the upper border of the Rectus medialis, and is joined, near the pulley of the Obliquus superior, by a filament from the supratrochlear nerve. It then passes to the medial angle of the eye, and supplies the skin of the eyelids and side of the nose, the conjunctiva, lacrimal sac, and caruncula lacrimalis.

The ethmoidal branches (nn. ethmoidales) supply the ethmoidal cells; the posterior branch leaves the orbital cavity through the posterior ethmoidal foramen and gives some filaments to the sphenoidal sinus.

The Ciliary Ganglion (ophthalmic or lenticular ganglion), as shown in FIG. 11, is a small, sympathetic ganglion, of a reddish-gray color, and about the size of a pin's head; it is situated at the back part of the orbit, in some loose fat between the optic nerve and the Rectus lateralis muscle, lying generally on the lateral side of the ophthalmic artery.

Its roots are three in number, and enter its posterior border. One, the long or sensory root, is derived from the nasociliary nerve, and joins its postero-superior angle. The second, the short or motor root, is a thick nerve (occasionally divided into two parts) derived from the branch of the oculomotor nerve to the Obliquus inferior, and connected with the postero-inferior angle of the ganglion. The motor root is supposed to contain sympathetic efferent fibers (preganglionic fibers) from the nucleus of the third nerve in the mid-brain to the ciliary ganglion where they form synapses with neurons whose fibers (postganglionic) pass to the Ciliary muscle and to Sphincter muscle of the pupil. The third, the sympathetic root, is a slender filament from the cavernous plexus of the sympathetic; it is frequently blended with the long root. According to Tiedemann, the ciliary ganglion receives a twig of communication from the sphenopalatine ganglion.

Its branches are the short ciliary nerves. These are delicate filaments, from six to ten in number, which arise from the forepart of the ganglion in two bundles connected with its superior and inferior angles; the lower bundle is the larger. They run forward with the ciliary arteries in a wavy course, one set above and the other below the optic nerve, and are accompanied by the long ciliary nerves from the nasociliary. They pierce the sclera at the back part of the bulb of the eye, pass forward in delicate grooves on the inner surface of the sclera, and are distributed to the Ciliaris muscle, iris, and cornea. Tiedemann has described a small branch as penetrating the optic nerve with the arteria centralis retinæ.

The Maxillary Nerve (n. maxillaris; superior maxillary nerve), as shown in FIG. 12, which is a diagrammatic side elevational view of the distribution of the maxillary and mandibular nerves and the submaxillary ganglion, or second division of the trigeminal, is a sensory nerve. It is intermediate, both in position and size, between the ophthalmic and mandibular. It begins at the middle of the semilunar ganglion as a flattened plexiform band, and, passing horizontally forward, it leaves the skull through the foramen rotundum, where it becomes more cylindrical in form, and firmer in texture. It then crosses the pterygopalatine fossa, inclines lateralward on the back of the maxilla, and enters the orbit through the inferior orbital fissure; it traverses the infraorbital groove and canal in the floor of the orbit, and appears upon the face at the infraorbital foramen[9]. At its termination, the nerve lies beneath the Quadratus labii superioris, and divides into a leash of branches which spread out upon the side of the nose, the lower eyelid, and the upper lip, joining with filaments of the facial nerve.

[9] After it enters the infraorbital canal, the nerve is frequently called the infraorbital.

Its branches may be divided into four groups, according as they are given off in the cranium, in the pterygopalatine fossa, in the infraorbital canal, or on the face.

In the Cranium—Middle meningeal.

In the Pterygopalatine Fossa—Zygomatic, Sphenopalatine, Posterior superior alveolar.

In the Infraorbital Canal—Anterior superior alveolar, Middle superior alveolar.

On the Face—Inferior palpebral, External nasal, Superior labial.

The Middle Meningeal Nerve (n. meningeus medius; meningeal or dural branch) is given off from the maxillary nerve directly after its origin from the semilunar ganglion; it accompanies the middle meningeal artery and supplies the dura mater.

The Zygomatic Nerve (n. zygomaticus; temporomalar nerve; orbital nerve) arises in the pterygopalatine fossa, enters the orbit by the inferior orbital fissure, and divides at the back of that cavity into two branches, zygomaticotemporal and zygomaticofacial.

The zygomaticotemporal branch (ramus zygomaticotemporalis; temporal branch) runs along the lateral wall of the orbit in a groove in the zygomatic bone, receives a branch of communication from the lacrimal, and, passing through a foramen in the zygomatic bone, enters the temporal fossa. It ascends between the bone, and substance of the Temporalis muscle, pierces the temporal fascia about 2.5 cm. above the zygomatic arch, and is distributed to the skin of the side of the forehead, and communicates with the facial nerve and with the aurículotemporal branch of the mandibular nerve. As it pierces the temporal fascia, it gives off a slender twig, which runs between the two layers of the fascia to the lateral angle of the orbit.

The zygomaticofacial branch (ramus zygomaticofacialis; malar branch) passes along the infero-lateral angle of the orbit, emerges upon the face through a foramen in the zygomatic bone, and, perforating the Orbicularis oculi, supplies the skin on the prominence of the cheek. It joins with the facial nerve and with the inferior palpebral branches of the maxillary.

The Sphenopalatine Branches (nn. sphenopalatini), two in number, descend to the sphenopalatine ganglion.

The Posterior Superior Alveolar Branches (rami alveolares superiores posteriores; posterior superior dental branches) arise from the trunk of the nerve just before it enters the infraorbital groove; they are generally two in number, but sometimes arise by a single trunk. They descend on the tuberosity of the maxilla and give off several twigs to the gums and neighboring parts of the mucous membrane of the cheek. They then enter the posterior alveolar canals on the infratemporal surface of the maxilla, and, passing from behind forward in the substance of the bone, communicate with the middle superior alveolar nerve, and give off branches to the lining membrane of the maxillary sinus and three twigs to each molar tooth; these twigs enter the foramina at the apices of the roots of the teeth.

The Middle Superior Alveolar Branch (ramus alveolaris superior medius; middle superior dental branch), is given off from the nerve in the posterior part of the infraorbital canal, and runs downward and forward in a canal in the lateral wall of the maxillary sinus to supply the two premolar teeth. It forms a superior dental plexus with the anterior and posterior superior alveolar branches.

The Anterior Superior Alveolar Branch (ramus alveolaris superior anteriores; anterior superior dental branch), of considerable size, is given off from the nerve just before its exit from the infraorbital foramen; it descends in a canal in the anterior wall of the maxillary sinus, and divides into branches which supply the incisor and canine teeth. It communicates with the middle superior alveolar branch, and gives off a nasal branch, which passes through a minute canal in the lateral wall of the inferior meatus, and supplies the mucous membrane of the anterior part of the inferior meatus and the floor of the nasal cavity, communicating with the nasal branches from the sphenopalatine ganglion.

The Inferior Palpebral Branches (rami palpebrales inferiores; palpebral branches) ascend behind the Orbicularis oculi. They supply the skin and conjunctiva of the lower eyelid, joining at the lateral angle of the orbit with the facial and zygomaticofacial nerves.

The External Nasal Branches (rami nasales externi) supply the skin of the side of the nose and of the septum mobile nasi, and join with the terminal twigs of the nasociliary nerve.

The Superior Labial Branches (rami labiales superiores; labial branches), the largest and most numerous, descend behind the Quadratus labii superioris, and are distributed to the skin of the upper lip, the mucous membrane of the mouth, and labial glands. They are joined, immediately beneath the orbit, by filaments from the facial nerve, forming with them the infraorbital plexus.

Sphenopalatine Ganglion (ganglion of Meckel), as shown in FIG. 13, which is a diagrammatic side elvational view of the sphenopalatine ganglion and its branches, is the largest of the sympathetic ganglia associated with the branches of the trigeminal nerve, is deeply placed in the pterygopalatine fossa, close to the sphenopalatine foramen. It is triangular or heart-shaped, of a reddish-gray color, and is situated just below the maxillary nerve as it crosses the fossa. It receives a sensory, a motor, and a sympathetic root.

Its sensory root is derived from two sphenopalatine branches of the maxillary nerve; their fibers, for the most part, pass directly into the palatine nerves; a few, however, enter the ganglion, constituting its sensory root. Its motor root is probably derived from the nervus intermedius through the greater superficial petrosal nerve and is supposed to consist in part of sympathetic efferent (preganglionic) fibers from the medulla. In the sphenopalatine ganglion they form synapses with neurons whose postganglionic axons, vasodilator and secretory fibers, are distributed with the deep branches of the trigeminal to the mucous membrane of the nose, soft palate, tonsils, uvula, roof of the mouth, upper lip and gums, and to the upper part of the pharynx. Its sympathetic root is derived from the carotid plexus through the deep petrosal nerve. These two nerves join to form the nerve of the pterygoid canal before their entrance into the ganglion.

The greater superficial petrosal nerve (n. petrosus superficialis major; large superficial petrosal nerve) is given off from the genicular ganglion of the facial nerve; it passes through the hiatus of the facial canal, enters the cranial cavity, and runs forward beneath the dura mater in a groove on the anterior surface of the petrous portion of the temporal bone. It then enters the cartilaginous substance which fills the foramen lacerum, and joining with the deep petrosal branch forms the nerve of the pterygoid canal.

The deep petrosal nerve (n. petrosus profundus; large deep petrosal nerve) is given off from the carotid plexus, and runs through the carotid canal lateral to the internal carotid artery. It then enters the cartilaginous substance which fills the foramen lacerum, and joins with the greater superficial petrosal nerve to form the nerve of the pterygoid canal.

The nerve of the pterygoid canal (n. canalis pterygoidei [Vidii]; Vidian nerve), formed by the junction of the two preceding nerves in the cartilaginous substance which fills the foramen lacerum, passes forward, through the pterygoid canal, with the corresponding artery, and is joined by a small ascending sphenoidal branch from the otic ganglion. Finally, it enters the pterygopalatine fossa, and joins the posterior angle of the sphenopalatine ganglion.

These are divisible into four groups, viz., orbital, palatine, posterior superior nasal, and pharyngeal.

The orbital branches (rami orbitales; ascending branches) are two or three delicate filaments, which enter the orbit by the inferior orbital fissure, and supply the periosteum. According to Luschka, some filaments pass through foramina in the frontoethmoidal suture to supply the mucous membrane of the posterior ethmoidal and sphenoidal sinuses.

The palatine nerves (nn. palatini; descending branches) are distributed to the roof of the mouth, soft palate, tonsil, and lining membrane of the nasal cavity. Most of their fibers are derived from the sphenopalatine branches of the maxillary nerve. They are three in number: anterior, middle, and posterior.

The anterior palatine nerve (n. palatinus anterior) descends through the pterygopalatine canal, emerges upon the hard palate through the greater palatine foramen, and passes forward in a groove in the hard palate, nearly as far as the incisor teeth. It supplies the gums, the mucous membrane and glands of the hard palate, and communicates in front with the terminal filaments of the nasopalatine nerve. While in the pterygopalatine canal, it gives off posterior inferior nasal branches, which enter the nasal cavity through openings in the palatine bone, and ramify over the inferior nasal concha and middle and inferior meatuses; at its exit from the canal, a palatine branch is distributed to both surfaces of the soft palate.

The middle palatine nerve (n. palatinus medius) emerges through one of the minor palatine canals and distributes branches to the uvula, tonsil, and soft palate. It is occasionally wanting.

The posterior palatine nerve (n. palatinus posterior) descends through the pterygopalatine canal, and emerges by a separate opening behind the greater palatine foramen; it supplies the soft palate, tonsil, and uvula. The middle and posterior palatine join with the tonsillar branches of the glossopharyngeal to form a plexus (circulus tonsillaris) around the tonsil.

The posterior superior nasal branches (rami nasales posteriores superiores) are distributed to the septum and lateral wall of the nasal fossa. They enter the posterior part of the nasal cavity by the sphenopalatine foramen and supply the mucous membrane covering the superior and middle nasal conchæ, the lining of the posterior ethmoidal cells, and the posterior part of the septum. One branch, longer and larger than the others, is named the nasopalatine nerve. It enters the nasal cavity through the sphenopalatine foramen, passes across the roof of the nasal cavity below the orifice of the sphenoidal sinus to reach the septum, and then runs obliquely downward and forward between the periosteum and mucous membrane of the lower part of the septum. It descends to the roof of the mouth through the incisive canal and communicates with the corresponding nerve of the opposite side and with the anterior palatine nerve. It furnishes a few filaments to the mucous membrane of the nasal septum.

The pharyngeal nerve (pterygopalatine nerve) is a small branch arising from the posterior part of the ganglion. It passes through the pharyngeal canal with the pharyngeal branch of the internal maxillary artery, and is distributed to the mucous membrane of the nasal part of the pharynx, behind the auditory tube.

The mandibular nerve (n. mandibularis; inferior maxillary nerve), as shown in FIGS. 12 and 14, which are, respectively, again a diagrammatic side elevational view of the distribution of the maxillary and mandibular nerves and the submaxillary ganglion, and a diagrammatic side elevational view of the mandibular division of the trifacial nerve, supplies the teeth and gums of the mandible, the skin of the temporal region, the auricula, the lower lip, the lower part of the face, and the muscles of mastication; it also supplies the mucous membrane of the anterior two-thirds of the tongue. It is the largest of the three divisions of the fifth, and is made up of two roots: a large, sensory root proceeding from the inferior angle of the semilunar ganglion, and a small motor root (the motor part of the trigeminal), which passes beneath the ganglion, and unites with the sensory root, just after its exit through the foramen ovale. Immediately beneath the base of the skull, the nerve gives off from its medial side a recurrent branch (nervus spinosus) and the nerve to the Pterygoideus internus, and then divides into two trunks, an anterior and a posterior.

The Nervus Spinosus (recurrent or meningeal branch) enters the skull through the foramen spinosum with the middle meningeal artery. It divides into two branches, anterior and posterior, which accompany the main divisions of the artery and supply the dura mater; the posterior branch also supplies the mucous lining of the mastoid cells; the anterior communicates with the meningeal branch of the maxillary nerve.

The Internal Pterygoid Nerve (n. pterygoideus internus) is a slender branch, which enters the deep surface of the muscle; it gives off one or two filaments to the otic ganglion.

The anterior and smaller division of the mandibular nerve receives nearly the whole of the fibers of the motor root of the nerve, and supplies the muscles of mastication and the skin and mucous membrane of the cheek. Its branches are the masseteric, deep temporal, buccinator, and external pterygoid.

The Masseteric Nerve (n. massetericus) passes lateralward, above the Pterygoideus externus, in front of the temporomandibular articulation, and behind the tendon of the Temporalis; it crosses the mandibular notch with the masseteric artery, to the deep surface of the Masseter, in which it ramifies nearly as far as its anterior border. It gives a filament to the temporomandibular joint.

The Deep Temporal Nerves (nn. temporales profundi) are two in number, anterior and posterior. They pass above the upper border of the Pterygoideus externus and enter the deep surface of the Temporalis. The posterior branch, of small size, is placed at the back of the temporal fossa, and sometimes arises in common with the masseteric nerve. The anterior branch is frequently given off from the buccinator nerve, and then turns upward over the upper head of the Pterygoideus externus. Frequently a third or intermediate branch is present.

The Buccinator Nerve (n. buccinatorus; long buccal nerve) passes forward between the two heads of the Pterygoideus externus, and downward beneath or through the lower part of the Temporalis; it emerges from under the anterior border of the Masseter, ramifies on the surface of the Buccinator, and unites with the buccal branches of the facial nerve. It supplies a branch to the Pterygoideus externus during its passage through that muscle, and may give off the anterior deep temporal nerve. The buccinator nerve supplies the skin over the Buccinator, and the mucous membrane lining its inner surface.

External Pterygoid Nerve (n. pterygoideus externus) frequently arises in conjunction with the buccinator nerve, but it may be given off separately from the anterior division of the mandibular nerve. It enters the deep surface of the muscle.

The posterior and larger division of the mandibular nerve is for the most part sensory, but receives a few filaments from the motor root. It divides into auriculotemporal, lingual, and inferior alveolar nerves.

The Auriculotemporal Nerve (n. auriculotemporalis) generally arises by two roots, between which the middle meningeal artery ascends. It runs backward beneath the Pterygoideus externus to the medial side of the neck of the mandible. It then turns upward with the superficial temporal artery, between the auricula and condyle of the mandible, under cover of the parotid gland; escaping from beneath the gland, it ascends over the zygomatic arch, and divides into superficial temporal branches.

The branches of communication of the auriculotemporal nerve are with the facial nerve and with the otic ganglion. The branches to the facial, usually two in number, pass forward from behind the neck of the mandible and join the facial nerve at the posterior border of the Masseter. The filaments to the otic ganglion are derived from the roots of the auriculotemporal nerve close to their origin.

Its branches of distribution are Anterior auricular, Articular, Branches to the external acoustic meatus, Parotid, and Superficial temporal.

The anterior auricular branches (nn. auriculares anteriores) are usually two in number; they supply the front of the upper part of the auricula, being distributed principally to the skin covering the front of the helix and tragus.

The branches to the external acoustic meatus (n. meatus auditorii externi), two in number, enter the meatus between its bony and cartilaginous portions and supply the skin lining it; the upper one sends a filament to the tympanic membrane.

The articular branches consist of one or two twigs which enter the posterior part of the temporomandibular joint.

The parotid branches (rami parotidei) supply the parotid gland.

The superficial temporal branches (rami temporales superficiales) accompany the superficial temporal artery to the vertex of the skull; they supply the skin of the temporal region and communicate with the facial and zygomaticotemporal nerves.

The Lingual Nerve (n. lingualis) supplies the mucous membrane of the anterior two-thirds of the tongue. It lies at first beneath the Pterygoideus externus, medial to and in front of the inferior alveolar nerve, and is occasionally joined to this nerve by a branch which may cross the internal maxillary artery. The chorda tympani also joins it at an acute angle in this situation. The nerve then passes between the Pterygoideus internus and the rams of the mandible, and crosses obliquely to the side of the tongue over the Constrictor pharyngis superior and Styloglossus, and then between the Hyoglossus and deep part of the submaxillary gland; it finally runs across the duct of the submaxillary gland, and along the tongue to its tip, lying immediately beneath the mucous membrane.

Its branches of communication are with the facial (through the chorda tympani), the inferior alveolar and hypoglossal nerves, and the submaxillary ganglion. The branches to the submaxillary ganglion are two or three in number; those connected with the hypoglossal nerve form a plexus at the anterior margin of the Hyoglossus.

Its branches of distribution supply the sublingual gland, the mucous membrane of the mouth, the gums, and the mucous membrane of the anterior two-thirds of the tongue; the terminal filaments communicate, at the tip of the tongue, with the hypoglossal nerve.

The Inferior Alveolar Nerve (n. alveolaris inferior; inferior dental nerve), as shown in FIG. 15, which is a diagrammatic side eelvational view of the mandibular division of the trifacial nerve seen from the middle line, is the largest branch of the mandibular nerve. It descends with the inferior alveolar artery, at first beneath the Pterygoideus externus, and then between the sphenomandibular ligament and the ramus of the mandible to the mandibular foramen. It then passes forward in the mandibular canal, beneath the teeth, as far as the mental foramen, where it divides into two terminal branches, incisive and mental.

The branches of the inferior alveolar nerve are the mylohyoid, dental, incisive, and mental.

The mylohyoid nerve (n. mylohyoideus) is derived from the inferior alveolar just before it enters the mandibular foramen. It descends in a groove on the deep surface of the ramus of the mandible, and reaching the under surface of the Mylohyoideus supplies this muscle and the anterior belly of the Digastricus.

The dental branches supply the molar and premolar teeth. They correspond in number to the roots of those teeth; each nerve entering the orifice at the point of the root, and supplying the pulp of the tooth; above the alveolar nerve they form an inferior dental plexus.

The incisive branch is continued onward within the bone, and supplies the canine and incisor teeth.

The mental nerve (n. mentalis) emerges at the mental foramen, and divides beneath the Triangularis muscle into three branches; one descends to the skin of the chin, and two ascend to the skin and mucous membrane of the lower lip; these branches communicate freely with the facial nerve.

Two small ganglia, the otic and the submaxillary, are connected with the mandibular nerve.

Otic Ganglion (ganglion oticum), as shown in FIG. 16, which is a diagrammatic side elevational view of the otic ganglion and its branches, is a small, ovalshaped, flattened ganglion of a reddish-gray color, situated immediately below the foramen ovale; it lies on the medial surface of the mandibular nerve, and surrounds the origin of the nerve to the Pterygoideus internus. It is in relation, laterally, with the trunk of the mandibular nerve at the point where the motor and sensory roots join; medially, with the cartilaginous part of the auditory tube, and the origin of the Tensor veli palatini; posteriorly, with the middle meningeal artery.

It is connected by two or three short filaments with the nerve to the Pterygoideus internus, from which it may obtain a motor, and possibly a sensory root. It communicates with the glossopharyngeal and facial nerves, through the lesser superficial petrosal nerve continued from the tympanic plexus, and through this nerve it probably receives a root from the glossopharyngeal and a motor root from the facial; its sympathetic root consists of a filament from the plexus surrounding the middle meningeal artery. The fibers from the glossopharyngeal which pass to the otic ganglion in the small superficial petrosal are supposed to be sympathetic efferent (preganglionic) fibers from the dorsal nucleus or inferior salivatory nucleus of the medulla. Fibers (postganglionic) from the otic ganglion with which these form synapses are supposed to pass with the auriculotemporal nerve to the parotid gland. A slender filament (sphenoidal) ascends from it to the nerve of the Pterygoid canal, and a small branch connects it with the chorda tympani.

Its branches of distribution are: a filament to the Tensor tympani, and one to the Tensor veli palatini. The former passes backward, lateral to the auditory tube; the latter arises from the ganglion, near the origin of the nerve to the Pterygoideus internus, and is directed forward. The fibers of these nerves are, however, mainly derived from the nerve to the Pterygoideus internus.

Submaxillary Ganglion (ganglion submaxillare), as shown in FIG. 12, is of small size and is fusiform in shape. It is situated above the deep portion of the submaxillary gland, on the hyoglossus, near the posterior border of the Mylohyoideus, and is connected by filaments with the lower border of the lingual nerve. It is suspended from the lingual nerve by two filaments which join the anterior and posterior parts of the ganglion. Through the posterior of these it receives a branch from the chorda tympani nerve which runs in the sheath of the lingual; these are sympathetic efferent (preganglionic) fibers from the facial nucleus or the superior salivatory nucleus of the medulla oblongata that terminate in the submaxillary ganglion. The postganglionic fibers pass to the submaxillary gland, it communicates with the sympathetic by filaments from the sympathetic plexus around the external maxillary artery.

Its branches of distribution are five or six in number; they arise from the lower part of the ganglion, and supply the mucous membrane of the mouth and the duct of the submaxillary gland, some being lost in the submaxillary gland. The branch of communication from the lingual to the forepart of the ganglion is by some regarded as a branch of distribution, through which filaments pass from the ganglion to the lingual nerve, and by it are conveyed to the sublingual gland and the tongue.

Pains referred to various branches of the trigeminal nerve are of very frequent occurrence, and should always lead to a careful examination in order to discover a local cause. As a general rule the diffusion of pain over the various branches of the nerve is at first confined to one only of the main divisions, and the search for the causative lesion should always commence with a thorough examination of all those parts which are supplied by that division; although in severe cases pain may radiate over the branches of the other main divisions. The commonest example of this condition is the neuralgia which is so often associated with dental caries—here, although the tooth itself may not appear to be painful, the most distressing referred pains may be experienced, and these are at once relieved by treatment directed to the affected tooth.

Many other examples of trigeminal reflexes could be quoted, but it will be sufficient to mention the more common ones. Dealing with the ophthalmic nerve, severe supraorbital pain is commonly associated with acute glaucoma or with disease of the frontal or ethmoidal air cells. Malignant growths or empyema of the maxillary antrum, or unhealthy conditions about the inferior conchæ or the septum of the nose, are often found giving rise to "second division" neuralgia, and should be always looked for in the absence of dental disease in the maxilla.

It is on the mandibular nerve, however, that some of the most striking reflexes are seen. It is quite common to meet with patients who complain of pain in the ear, in whom there is no sign of aural disease, and the cause is usually to be found in a carious tooth in the mandible. Moreover, with an ulcer or cancer of the tongue, often the first pain to be experienced is one which radiates to the ear and temporal fossa, over the distribution of the auriculotemporal nerve.

The trigeminal nerve[10] is the largest cranial nerve and is the great sensory nerve of the head and face, and the motor nerve of the muscles of mastication.

[10] www.bartleby.com/107/200.html.

It emerges from the side of the pons, near its upper border, by a small motor and a large sensory root—the former being situated in front of and medial to the latter.

Numerous innovations for dental training aids have been provided in the prior art, which will be described below in chronological order to show advancement in the art, and which are incorporated herein by reference thereto. Even though these innovations may be suitable for the specific individual purposes to which they address, they each differ in structure, and/or operation, and/or purpose from the embodiments of the present invention in that they do not teach a training aid for a dental injection.

(1) U.S. Pat. No. 4,035,920 to Saupe.

U.S. Pat. No. 4,035,920 issued to Saupe on Jul. 19, 1977 teaches a dental teaching device having a dummy head displaceably mounted within predetermined ranges of movement on a holder so that the head can be adjusted to any desired position for a practice dental treatment. The holder has a curved socket in which a curved rear portion of the head is slidably received. The curved socket is shielded from exposure to contaminant material by the dummy head thereabove for all positions of adjustment of the head relative to the holder. An opening in the curved rear portion of the head is defined by a rim constituting a limit stop engageable with a stop element secured to the holder and extending into the interior of the head through the opening.

(2) U.S. Pat. No. 5,102,340 to Berlinghoff et al.

U.S. Pat. No. 5,102,340 issued to Berlinghoff et al. on Apr. 7, 1992 teaches a dental teaching and practicing apparatus for the simulation and practice of dental-clinical working or operating procedures, such as are generally employed for the education and training of dentists and their assistants. The apparatus representing or incorporating a patient-simulator can be individually positioned, especially with consideration being given to limited space or place conditions, whereby during non-use thereof the apparatus can be brought into a space-saving stored position, and can also be set up in such a manner that within an unchanged assembly it is comfortable for either a right-handed or left-handed person.

(3) U.S. Pat. No. 5,108,292 to Kirk et al.

U.S. Pat. No. 5,108,292 issued to Kirk et al. on Apr. 28, 1992 teaches a dental oral simulator designed to teach the skills an operator will require in practice when dealing with a supine patient in the ergonomically preferred work zone in the midsagittal plane at heart level and in myocentric relationship. Training jaws of the dental simulator are supported to simulate the movement of the jaws in a skull about the occipito-atlantal joint. A concave dish supported on the end or a mounting arm provides bearing support for a semi spherical bowl with the attachment between the bowl and the concave dish operating to allow controlled movement of the bowl through the range of useful dental treatment anatomical movements by a human skull about its occipito-atlantal joint with the mounting for the training jaws located on the mandible plane.

(4) U.S. Pat. No. 5,480,307 to Lang et al.

U.S. Pat. No. 5,480,307 issued to Lang et al. on Jan. 2, 1996 teaches a training and practice apparatus for simulating and practicing clinical dental processes, including a model bust having a chest part, a neck, and a head, and is swivel-mounted on a carrier. The head is mounted on a head carrier by way of a joint and can thereby be swivelled into different working positions and fixed in the adopted swivel position. The joint is arranged in the neck. The neck has an engagement recess opening approximately coaxially at its bottom end and the head carrier is a bearing rod engaging in the engagement recess on which the joint is arranged and which is mounted in the chest part.

(5) U.S. Pat. No. 6,361,323 to Beach et al.

U.S. Pat. No. 6,361,323 issued to Beach et al. on Mar. 26, 2002 teaches a system for use in skill acquisition, transfers and verification for performer, including a simulated object, i.e., simulated head, to which the performer would perform clinical procedure. An image pickup, e.g., CCD camera, picks up an image of a point indicator provided on the performer or an instrument. Using the picked-up image, an image signal corresponding to the picked-up image is made. An image processor processes the image signal and generates data for showing a movement or tracks of the point indicator on a two-dimensional coordinate system. Thereby, a display shows tracks of the point indicator by using coordinate data.

(6) U.S. Pat. No. 6,988,894 to Lee et al.

U.S. Pat. No. 6,988,894 issued to Lee et al. on Jan. 24, 2006 teaches a dental training aid and method for assisting a student in learning how to determine the position of a root canal apex, repair of dental decay, and how to perform crown and bridge procedures. In certain embodiments, modular inserts are utilized including structure thereon for performing root canal procedures, repair of dental decay procedures, crown and bridge procedures, or other procedures. The inserts can be assembled and configured to all provide practice on the same procedure or on different procedures and can be exchanged for other inserts once they are no longer reusable or because the user wants to train on a different procedure.

It is apparent that numerous innovations for dental training aids have been provided in the prior art, which are adapted to be used. Furthermore, even though these innovations may be suitable for the specific individual purposes to which they address, they would not be suitable for the purposes of the embodiments of the present invention as heretofore described, namely, a training aide for a dental injection.

3. SUMMARY OF THE INVENTION

Thus, an object of the embodiments of the present invention is to provide a training aid for a dental injection, which avoids the disadvantages of the prior art.

Briefly stated, another object of the embodiments of the present invention is to provide a training aid for a dental injection, including a human-like head model, a first apparatus for alerting when the dental injection is properly positioned in the human-like head model, and a second apparatus for alerting when the dental injection is not properly positioned in the human-like head model. The interior structure of the human-like head includes for targeting purposes the maxilla with appropriate arteries and nerves being clearly visible, the mandible with appropriate arteries and nerves being clearly visible, and the buccal gingiva over the mandibular canal being clearly visible. The first apparatus and the second apparatus are so positioned within the human-like head model to allow for training for the dental injection including a V2 block including infiltration, posterior superior alveolar, middle superior alveolar anterior superior, infraorbital, greater palatine, and nasopalatine, and V3 blocks including inferior alveolar, buccal nerve, and mental block.

The novel features considered characteristic of the embodiments of the present invention are set forth in the appended claims. The embodiments of the present invention themselves, however, both as to their construction and their method of operation together with additional objects and advantages thereof will be best understood from the following description of the specific embodiments when read and understood in connection with the accompanying figures of the drawing.

4. BRIEF DESCRIPTION OF THE FIGURES OF THE DRAWING

The figures of the drawing are briefly described as follows:

FIG. 17 is a diagrammatic side elevational view of the training aid for a dental injection of the present invention in use.

5. LIST OF REFERENCE NUMERALS UTILIZED IN THE FIGURES OF THE DRAWING

A. General

Figure 1:
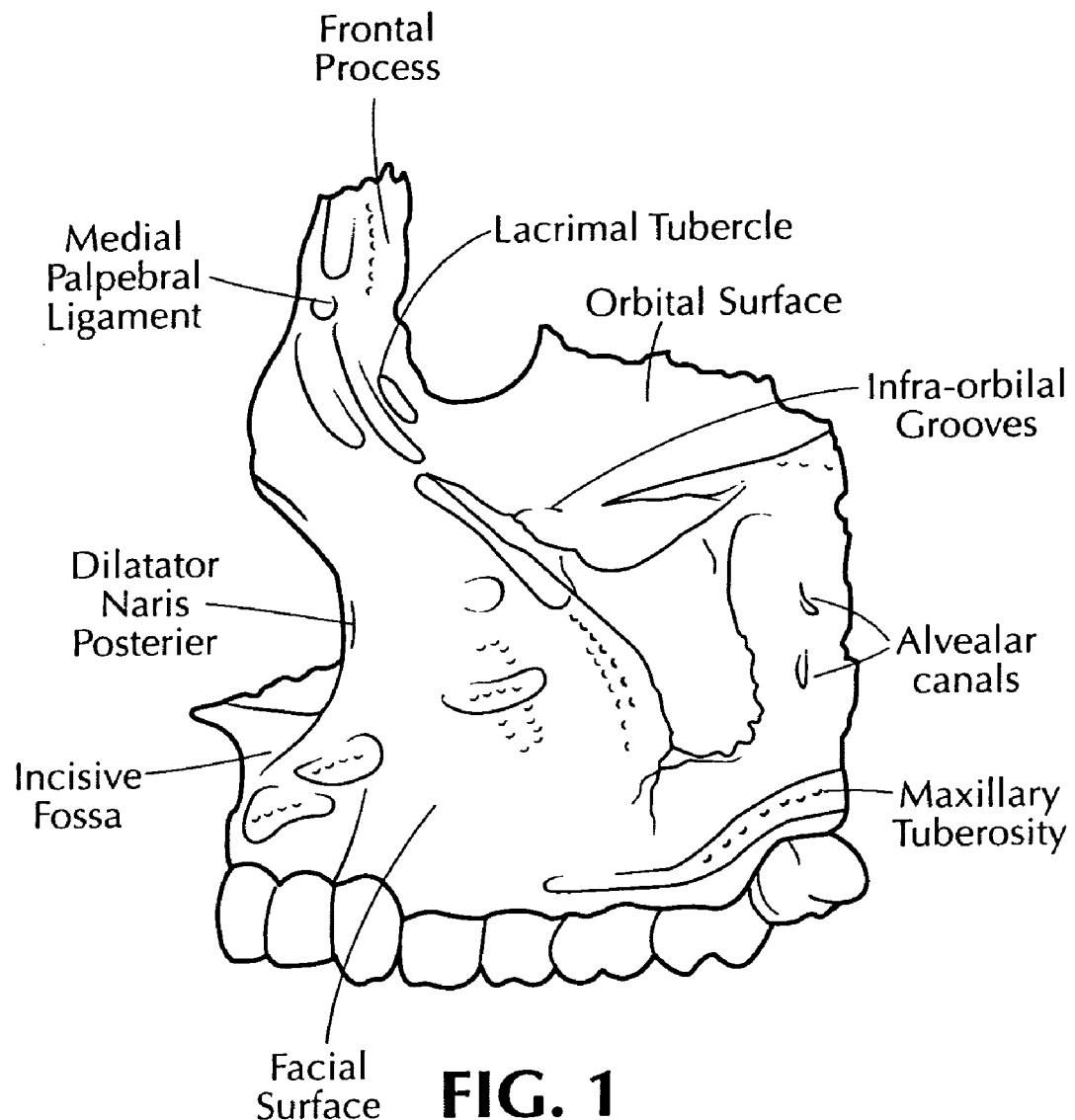
FIG. 1 is diagrammatic side elevational view of the outer surface of the left maxilla.
Figure 2:
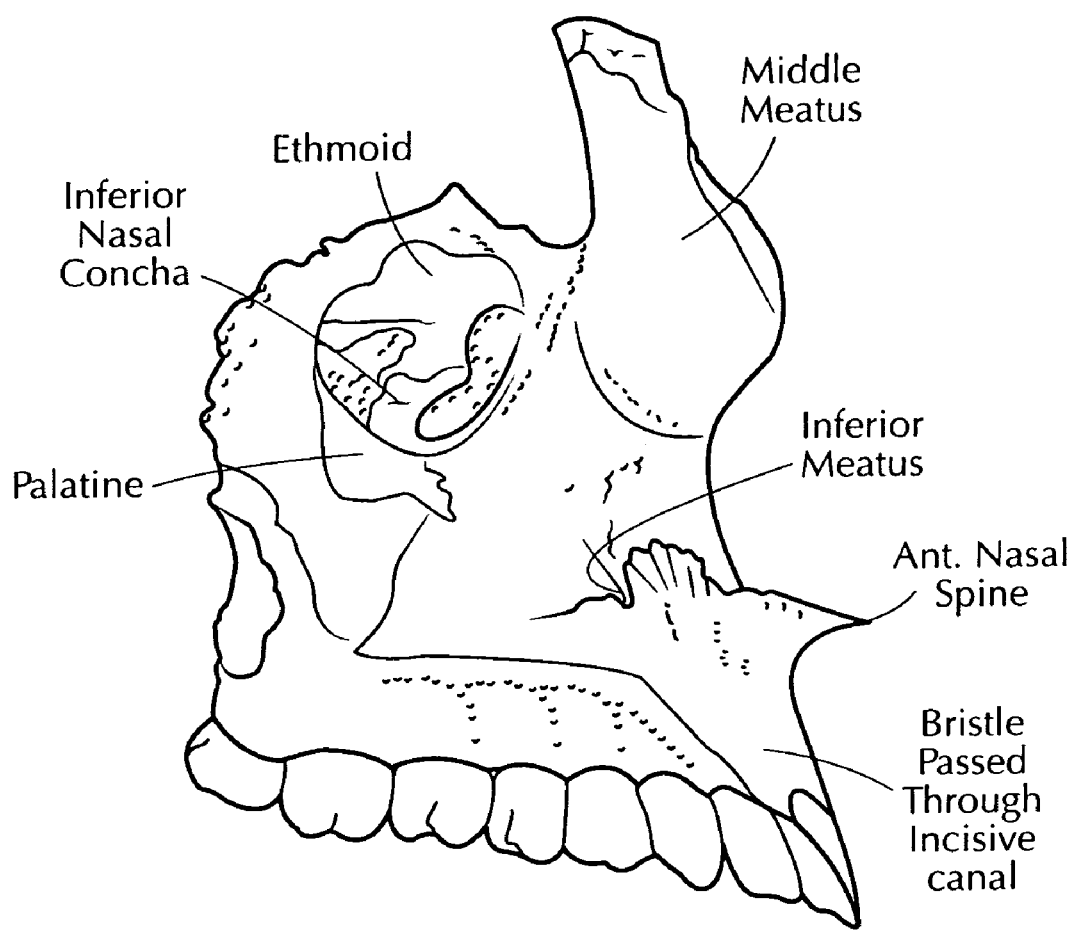
FIG. 2 is a diagrammatic side elevational view of the nasal surface of the left maxilla.
Figure 3:
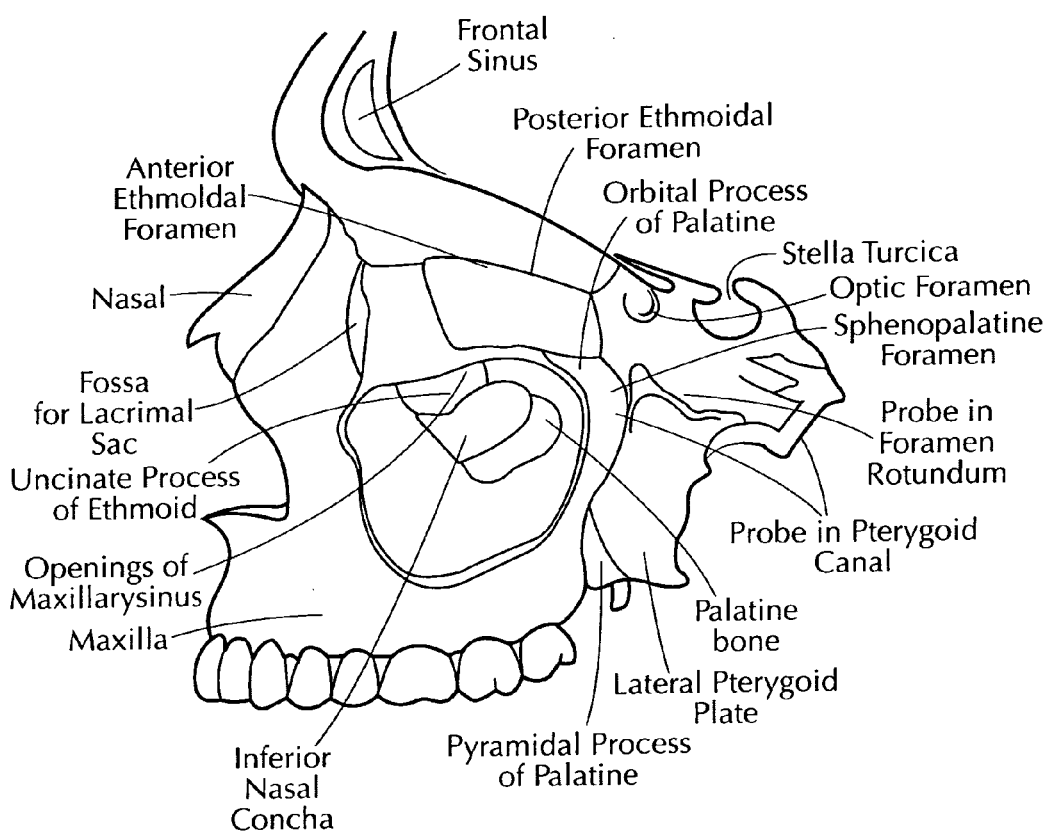
FIG. 3 is a diagrammatic side elevational view of the left maxillary sinus opened from the exterior.
Figure 4:
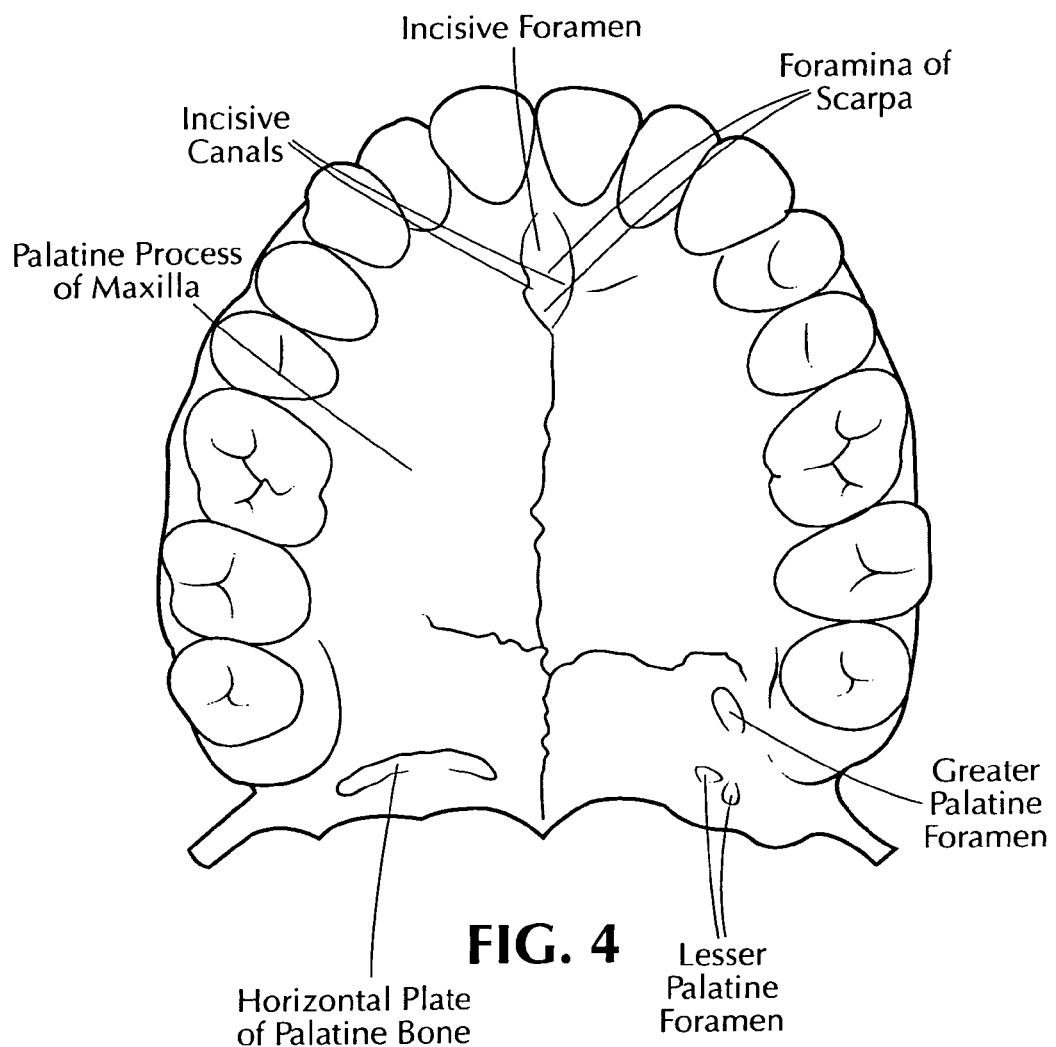
FIG. 4 is a diagrammatic plan view of the bony palate and alveolar.
Figure 5:
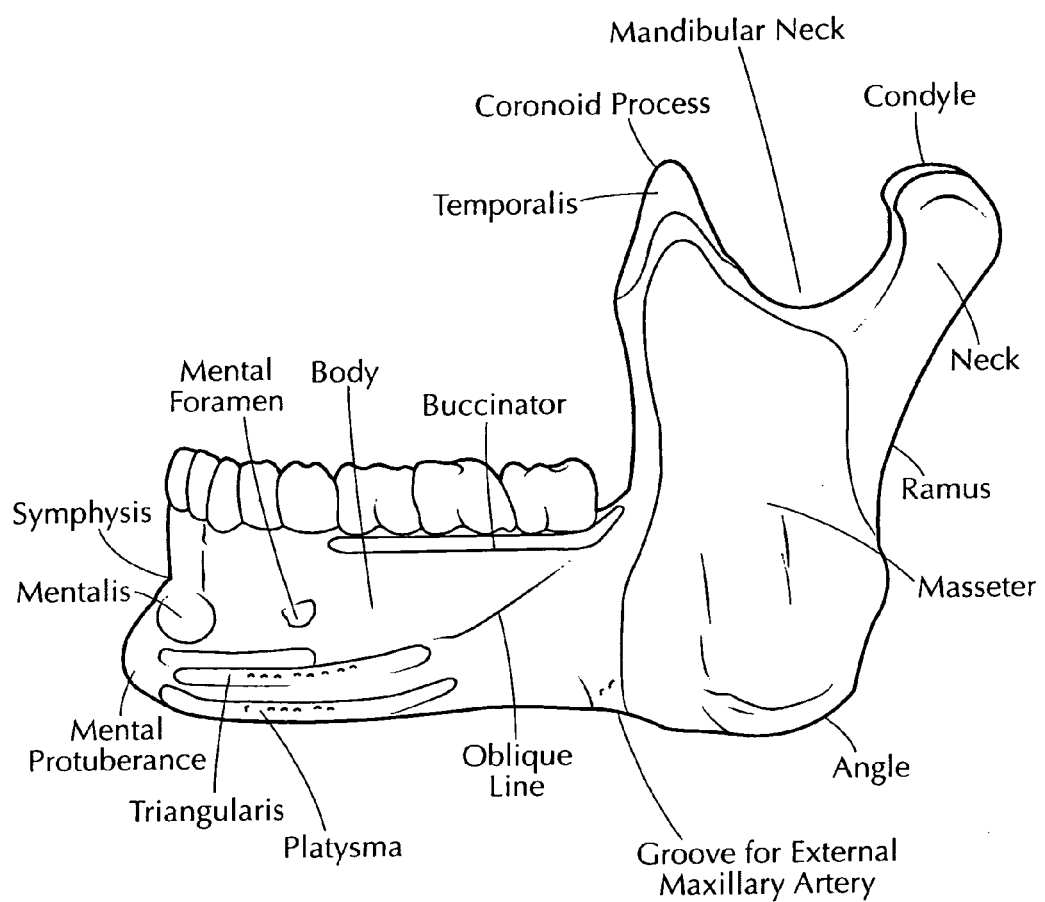
FIG. 5 is a diagrammatic side elevational view of the outer surface of the mandible.
Figure 6:
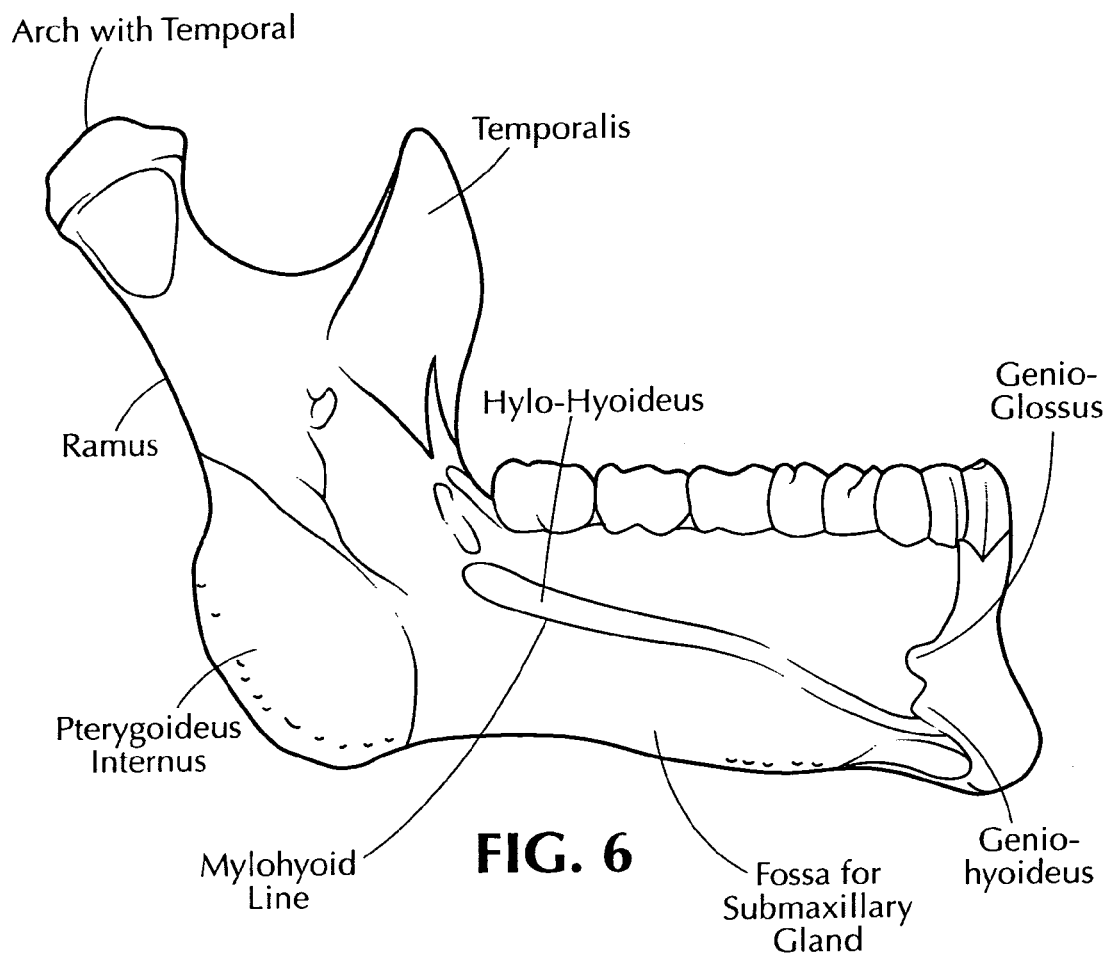
FIG. 6 is a diagrammatic side elevational view of the inner surface of the mandible.
Figure 7:
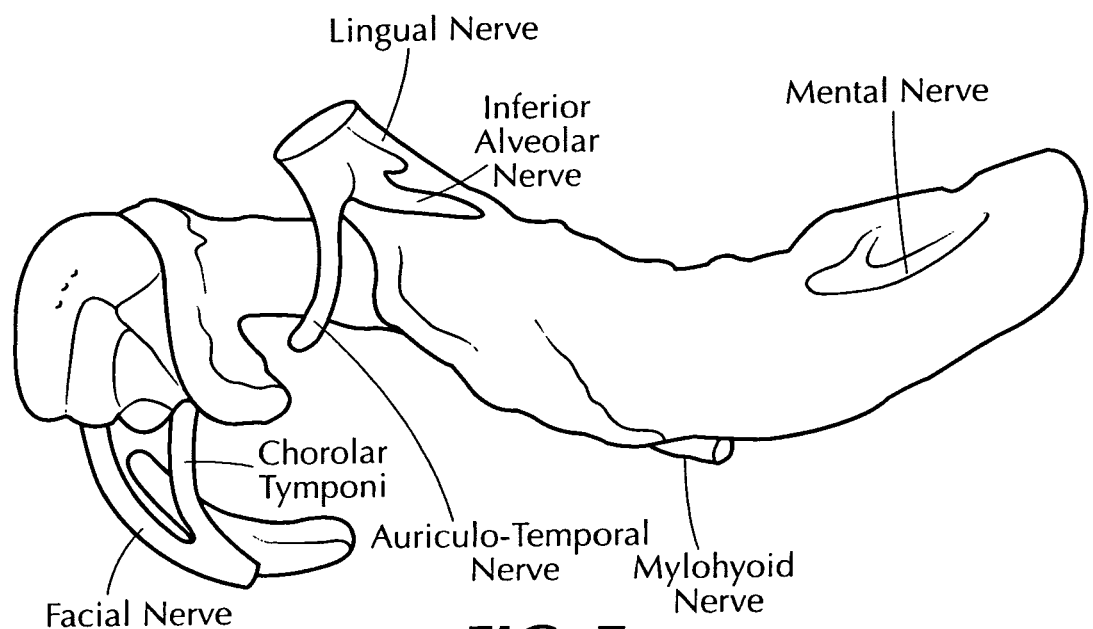
FIG. 7 is a diagrammatic side elevational view of the outer aspect of the mandible of a human embryo 24 mm. long.
Figure 8:
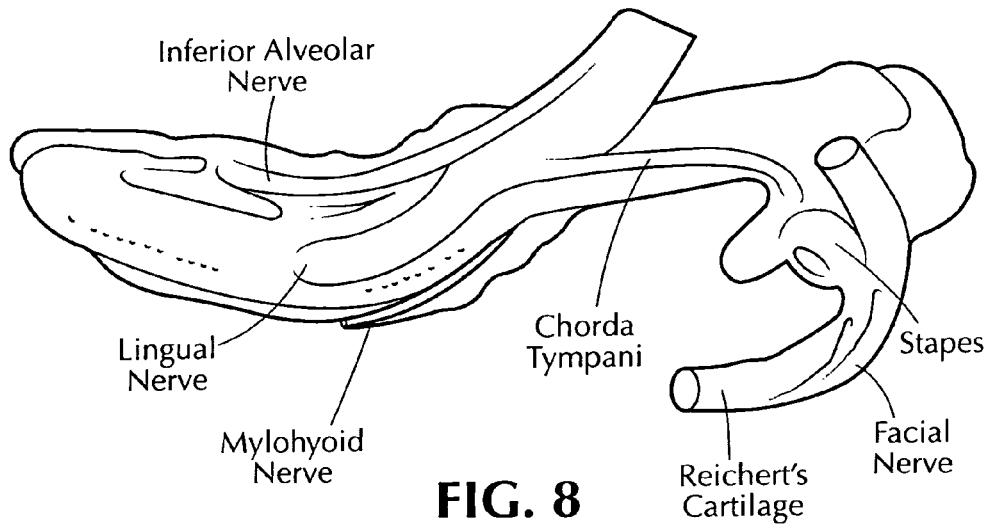
FIG. 8 is a diagrammatic side elevational view of the inner aspect of the mandible of a human embryo 24 mm. long.
Figure 9:
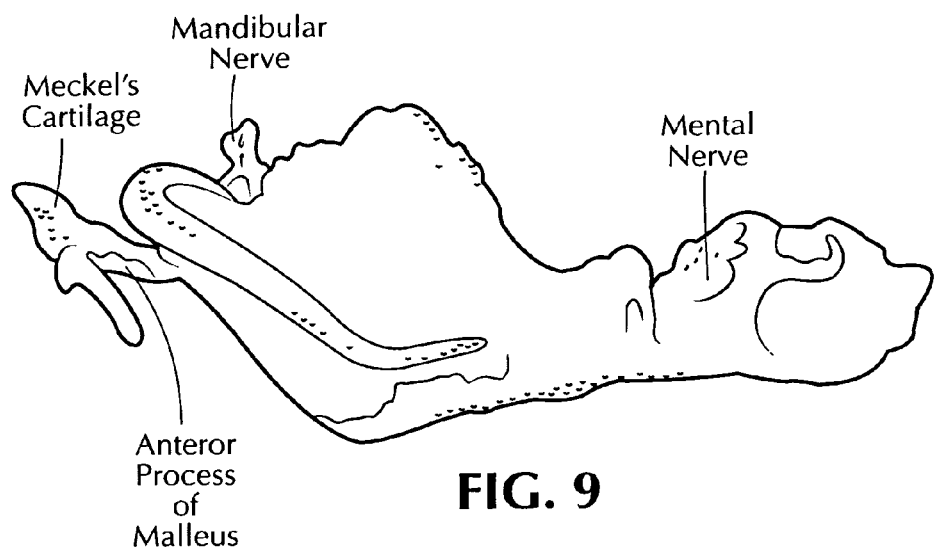
FIG. 9 is a diagrammatic side elevational view of the outer aspect of the mandible of a human embryo 95 mm. long.
Figure 10:
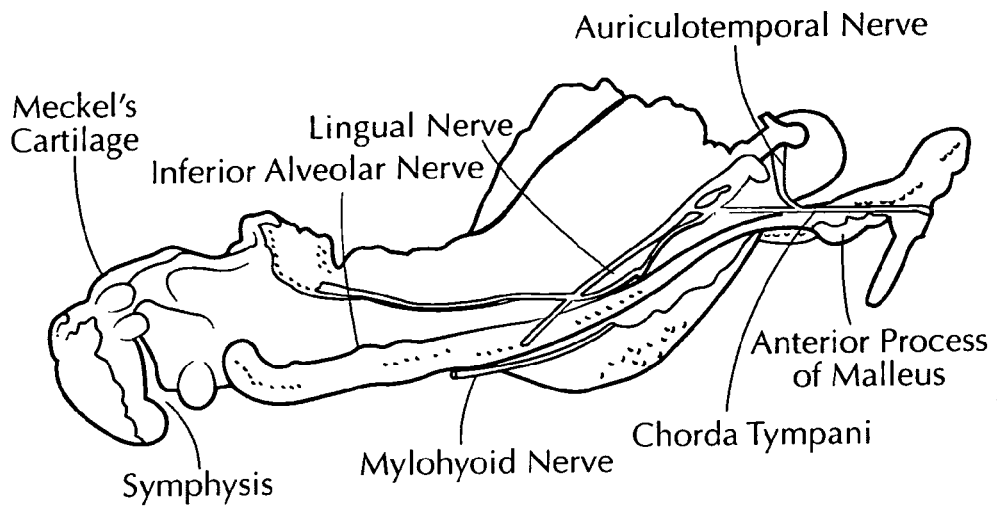
FIG. 10 is a diagrammatic side elevational view of the inner aspect of the mandible of a human embryo 95 mm. long.
Figure 11:
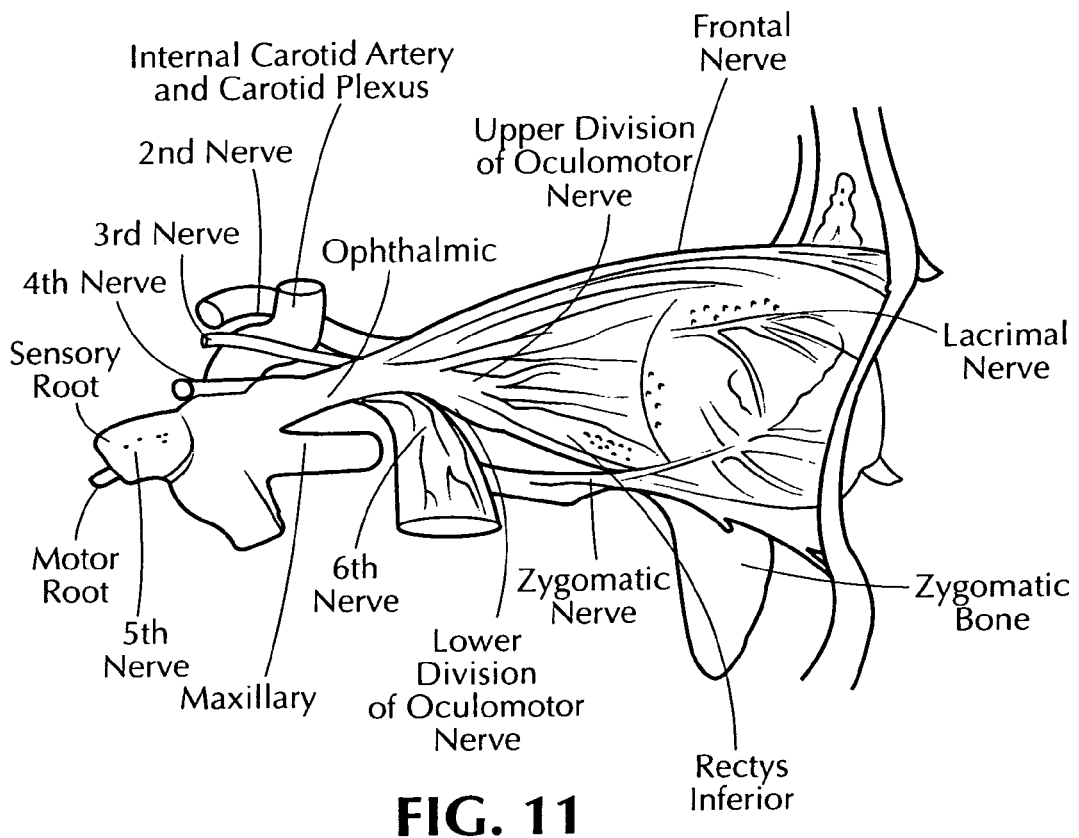
FIG. 11 is a diagrammatic side elevational view of the nerves of the orbit and the ciliary ganglion.
Figure 12:
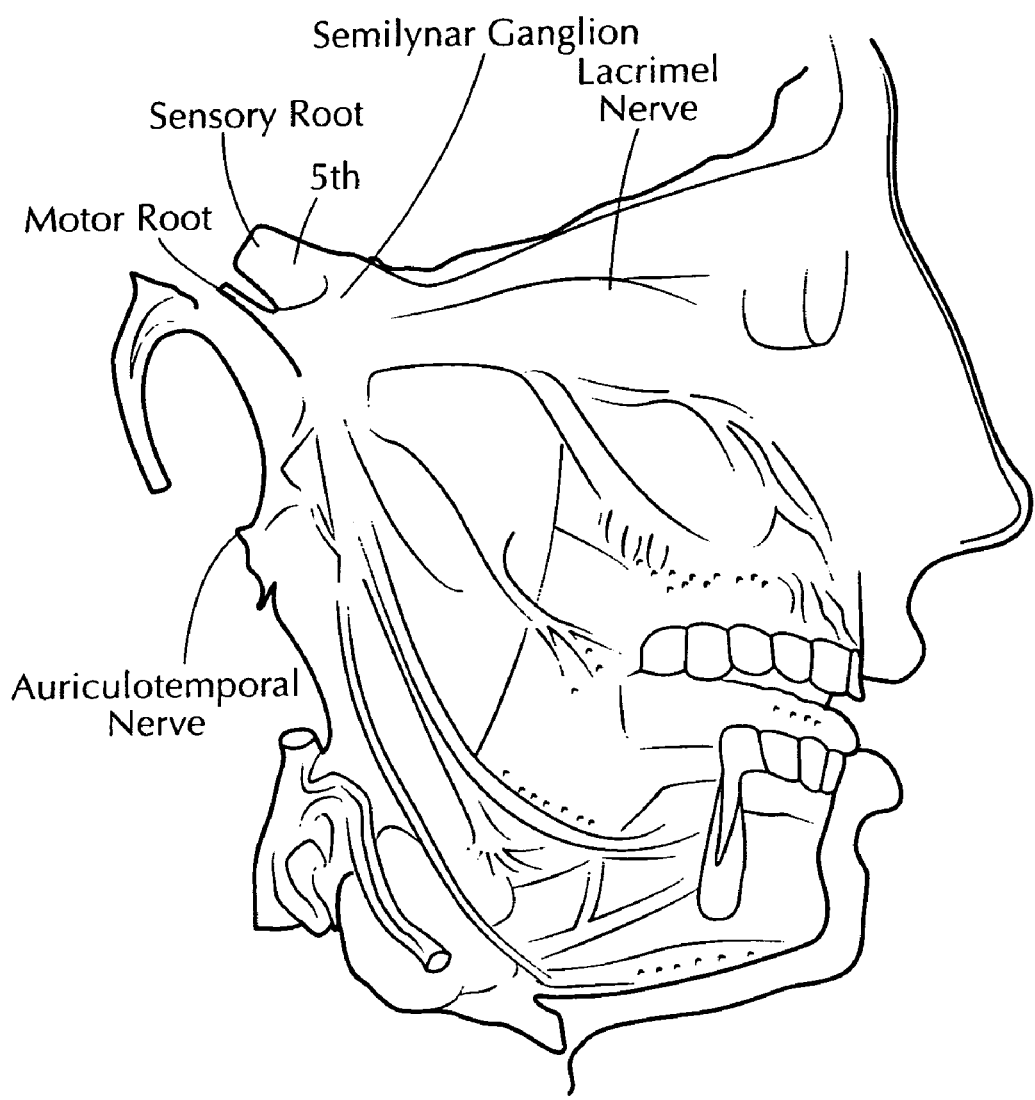
FIG. 12 is a diagrammatic side elevational view of the distribution of the maxillary and mandibular nerves and the submaxillary ganglion.
Figure 13:
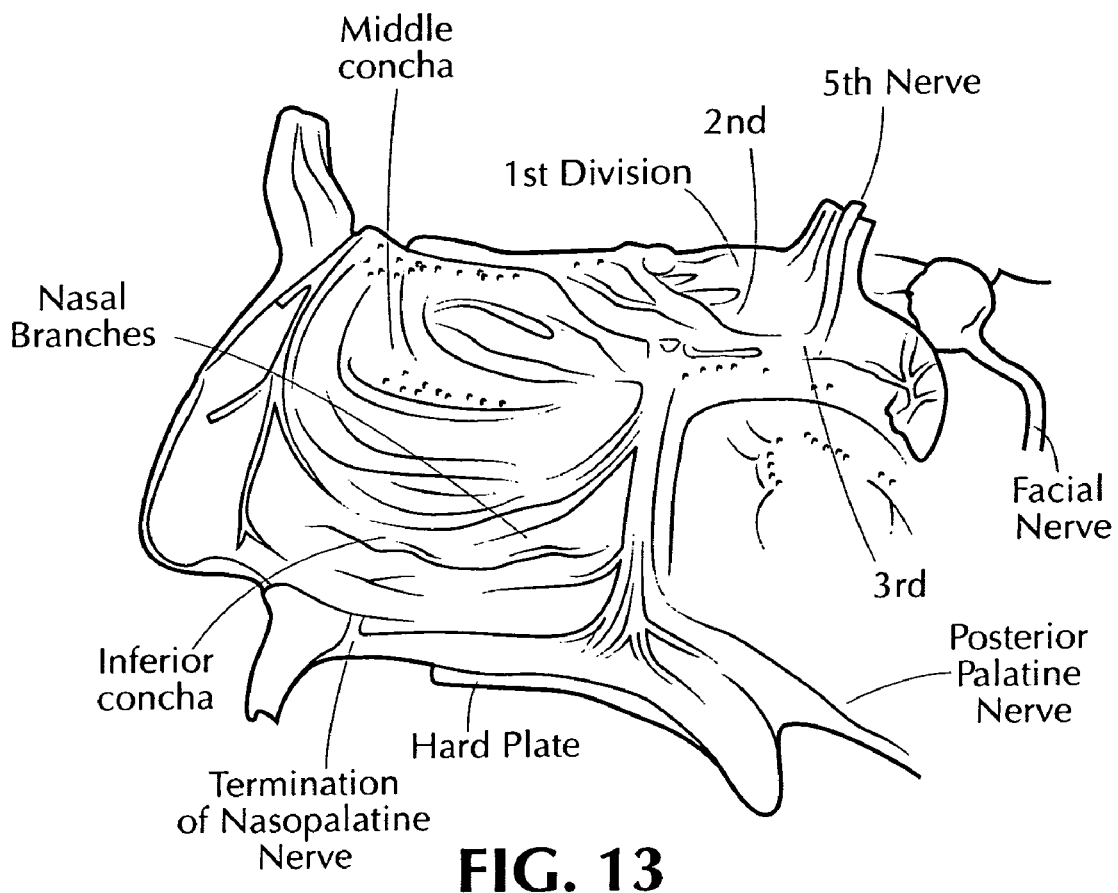
FIG. 13 is a diagrammatic side elevational view of the sphenopalatine ganglion and its branches.
Figure 14:
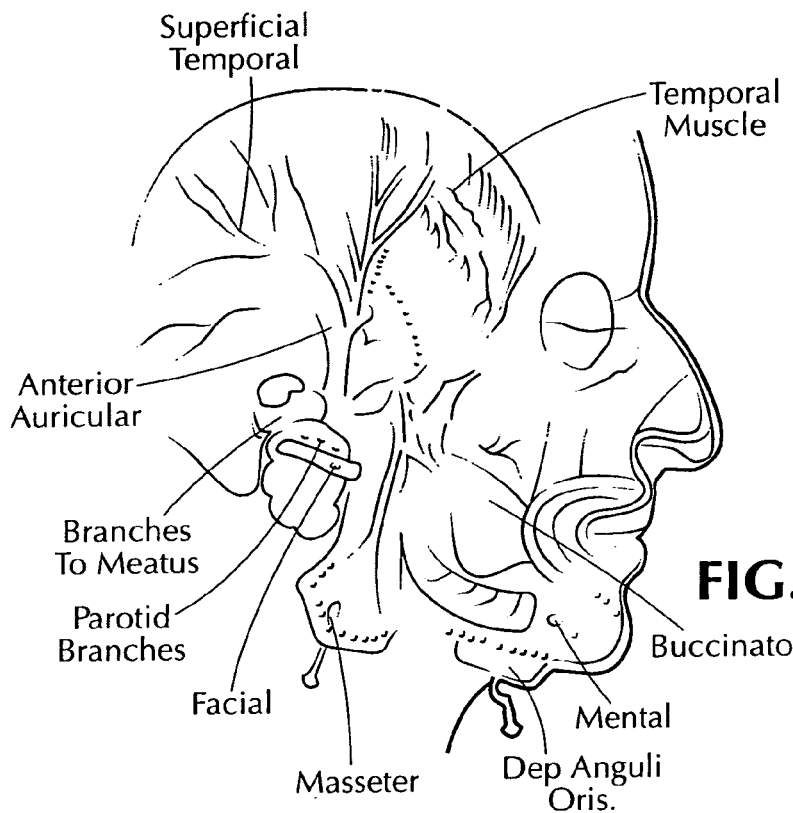
FIG. 14 is a diagrammatic side elevational view of the mandibular division of the trifacial nerve.
Figure 15:
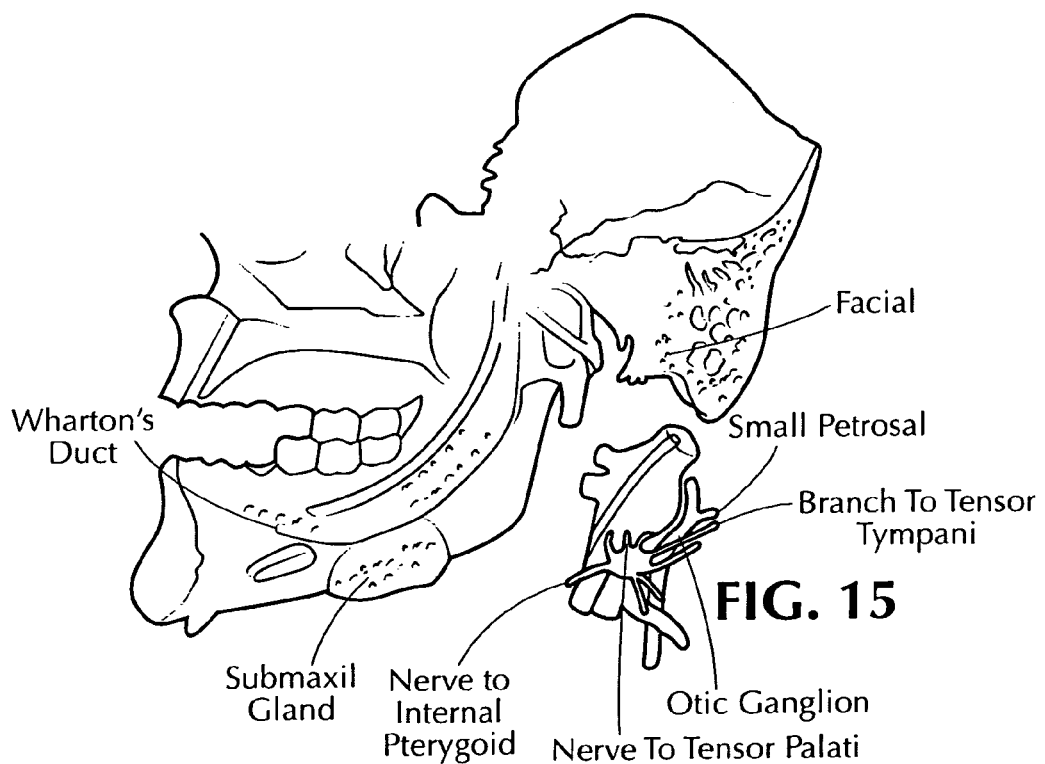
FIG. 15 is a diagrammatic side elevational view of the mandibular division of the trifacial nerve seen from the middle line.
Figure 16:
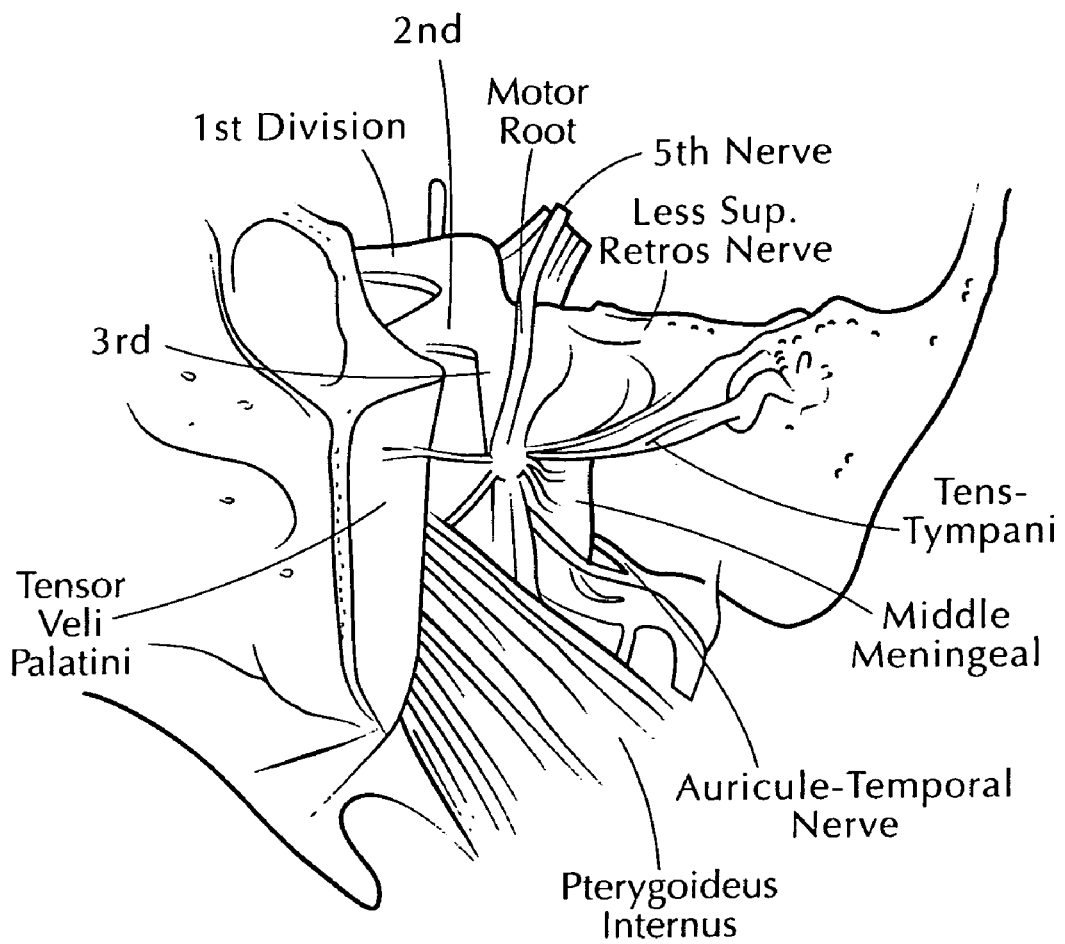
FIG. 16 is a diagrammatic side elevational view of the otic ganglion and its branches.

20 training aid of embodiments of present invention for dental injection 22
22 dental injection

B. Configuration

24 human-like head model
26 first apparatus for alerting when dental injection 22 is properly positioned in human-like head model 24
28 second apparatus for alerting when dental injection 22 is not properly positioned in human-like head model 24
30 first material of human-like head model 24
32 working mouth of human-like head model 24
34 teeth of working mouth 32 of human-like head model 24
36 tongue of working mouth 32 of human-like head model 24
38 interior structure of working mouth 32 of human-like head model 24
40 second material of working mouth 32 of human-like head model 24
42 base of human-like head model 24
44 first conductor of first apparatus 26
46 alert circuit of first apparatus 26
48 alert of first apparatus 26
50 second conductor of second apparatus 28
52 alert circuit of second apparatus 28
54 alert of second apparatus 28

6. DETAILED DESCRIPTION OF THE PREFERRED EMBODIMENTS

A. General

Referring now to FIG. 17, which is a diagrammatic side elevational view of the training aid for a dental injection of the present invention in use, the training aid of the present invention is shown generally at 20 for a dental injection 22.

B. The Configuration

The training aid 20 comprises a human-like head model 24, a first apparatus 26 for alerting when the dental injection 22 is properly positioned in the human-like head model 24, and a second apparatus 28 for alerting when the dental injection 22 is not properly positioned in the human-like head model 24. The human-like head 24 is so created so as to recreate the feel of giving the dental injection 22.

The human-like head model 24 is covered by a first material 30 representing skin, and contains a working mouth 32 having teeth 34, a tongue 36, an interior structure 38, and a second material 40 representing gingiva.

The first material 30 of the human-like head model 24 and the second material 40 of the working mouth 32 of the human-like head model 24 are rubber, while the second material 40 of the working mouth 32 of the human-like head model 24 is also either clear or transparent.

The first apparatus 26 includes a first conductor 44. The first conductor 44 of the first apparatus 26 extends along the maxilla in the human-like head model 24 and the mandible in the human-like head model 24, specifically, at the posterior superior alveolar in the human-like head model 24, at the middle superior alveolar anterior superior in the human-like head model 24, at the infraorbital in the human-like head model 24, at the greater palatine in the human-like head model 24, at the nasopalatine in the human-like head model 24, at the inferior alveolar in the human-like head model 24, and at the buccal nerve in the human-like head model 24. The dental injection 22 is operatively connected to the first conductor 44 of the first apparatus 26, and when the dental injection 22 makes contact with the first conductor 44 of the first apparatus 26, an alert circuit 46 of the first apparatus 26 is completed and an alert 48 of the first apparatus 26 operates indicating that the dental injection 22 is properly positioned in the human-like head model 24.

The second apparatus 28 includes a second conductor 50. The second conductor 50 of the second apparatus 28 extends along the along the maxilla in the human-like head model 24 and the mandible in the human-like head model 24, specifically, not at the posterior superior alveolar in the human-like head model 24, not at the middle superior alveolar anterior superior in the human-like head model 24, not at the infraorbital in the human-like head model 24, not at the greater palatine in the human-like head model 24, not at the nasopalatine in the human-like head model 24, not at the inferior alveolar in the human-like head model 24, and not at the buccal nerve in the human-like head model 24. The dental injection 22 is operatively connected to the second conductor 50 of the second apparatus 28, and when the dental injection 22 makes contact with the second conductor 50 of the second apparatus 28, an alert circuit 52 of the second apparatus 28 is completed and an alert 54 of the second apparatus 28 operates indicating that the dental injection 22 is improperly positioned in the human-like head model 24.

The working mouth 32 of the human-like head model 24 is made of rubber, a material replicating the gingiva, so that when the dental injection 22 is inserted, the feel of giving the dental injection 22 is recreated.

The teeth 34 of the working mouth 32 of the human-like head 24 are removable.

The human-like head model 24 has a base 42 for allowing the human-like head model 24 to turn right and left.

The interior structure 38 of the working mouth 32 of the human-like head 24 includes for targeting purposes the maxilla with appropriate arteries and nerves being clearly visible, and the mandible with appropriate arteries and nerves being clearly visible.

The mandible stays open on its own once opened.

The interior structure 38 of the working mouth 32 of the human-like head 24 further includes for targeting purposes the buccal gingiva over the mandibular canal being clearly visible.

The buccal gingiva over the mandibular canal is either clear or tinted, and is removable using either snaps or hook and loop fasteners.

The first apparatus 26 and the second apparatus 28 are so positioned within the human-like head model 24 to allow for training for the dental injection 22 including a V2 block including infiltration, posterior superior alveolar, middle superior alveolar anterior superior, infraorbital, greater palatine, and nasopalatine, and V3 blocks including inferior alveolar, buccal nerve, and mental block.

The first apparatus 26 and the second apparatus 28 can be either audio, visual, or both.

C. Conclusions

It will be understood that each of the elements described above or two or more together may also find a useful application in other types of constructions differing from the types described above.

While the embodiments of the present invention have been illustrated and described as embodied in a training aid for a dental injection, however, they are not limited to the details shown, since it will be understood that various omissions, modifications, substitutions, and changes in the forms and details of the embodiments of the present invention illustrated and their operation can be made by those skilled in the art without departing in any way from the spirit of the embodiments of the present invention.

Without further analysis the foregoing will so fully reveal the gist of the embodiments of the present invention that others can by applying current knowledge readily adapt it for various applications without omitting features that from the standpoint of prior art fairly constitute characteristics of the generic or specific aspects of the embodiments of the present invention.

The invention claimed is:

1. A training aid for a dental injection, comprising:
   a) a human-like head model;
   b) first means for alerting when the dental injection is properly positioned in said human-like head model; and
   c) second means for alerting when the dental injection is not properly positioned in said human-like head model;
   wherein said human-like head is so created so as to recreate the feel of giving the dental injection.

2. The aid of claim 1, wherein said human-like head model is covered by a first material representing skin.

3. The aid of claim 1, wherein said human-like head model contains a working mouth.

4. The aid of claim 3, wherein said working mouth of said human-like head model has:
   a) teeth;
   b) a tongue;
   c) an interior structure; and
   d) a second material representing gingiva.

5. The aid of claim 4, wherein said first material of said human-like head model and said second material of said working mouth of said human-like head model are rubber.

6. The aid of claim 4, wherein said second material of said working mouth of said human-like head model is one of clear and transparent.

7. The aid of claim 4, wherein said teeth of said working mouth of said human-like head are removable.

8. The aid of claim 1, wherein said human-like head model has a base for allowing said human-like head model to turn right and left.

9. The aid of claim 4, wherein said interior structure of said working mouth of said human-like head includes for targeting purposes the maxilla with appropriate arteries and nerves being clearly visible, and the mandible with appropriate arteries and nerves being clearly visible.

10. The aid of claim 9, wherein said mandible stays open on its own once opened.

11. The aid of claim 4, wherein said interior structure of said working mouth of said human-like head includes for targeting purposes the buccal gingiva over the mandibular canal being clearly visible.

12. The aid of claim 11, wherein said buccal gingiva over said mandibular canal is one of clear and tinted.

13. The aid of claim 11, wherein said buccal gingiva over said mandibular canal is removable using one of snaps and hook and loop fasteners.

14. The aid of claim 9, wherein said first means and said second means are so positioned within said human-like head model to allow for training for the dental injection including a V2 block including infiltration, posterior superior alveolar, middle superior alveolar anterior superior, infraorbital, greater palatine, and nasopalatine, and V3 blocks including inferior alveolar, buccal nerve, and mental block.

15. The aid of claim 14, wherein said first means has an alert;
   wherein said alert of said first means is at least one of audio and visual;
   wherein said second means has an alert; and
   wherein said alert of said second means is at least one of audio and visual.

* * * * *